(12) United States Patent
Murakami

(10) Patent No.: US 6,789,722 B2
(45) Date of Patent: Sep. 14, 2004

(54) JOINING METHOD AND APPARATUS USING FRICTIONAL AGITATION

(75) Inventor: Kotoyoshi Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 2 days.

(21) Appl. No.: 10/296,715

(22) PCT Filed: Mar. 8, 2002

(86) PCT No.: PCT/JP02/02172
§ 371 (c)(1),
(2), (4) Date: Nov. 27, 2002

(87) PCT Pub. No.: WO02/078893
PCT Pub. Date: Oct. 10, 2002

(65) Prior Publication Data
US 2003/0141343 A1 Jul. 31, 2003

(30) Foreign Application Priority Data
Mar. 29, 2001 (JP) .................... 2001-097277
Mar. 29, 2001 (JP) .................... 2001-097278
Mar. 29, 2001 (JP) .................... 2001-097279

(51) Int. Cl.$^7$ ............................... B23K 31/02
(52) U.S. Cl. .................... 228/112.1; 228/2.1
(58) Field of Search ............... 228/112.1, 2.1

(56) References Cited

U.S. PATENT DOCUMENTS

| | | | |
|---|---|---|---|
| 5,460,317 A | | 10/1995 | Thomas et al. |
| 5,697,544 A | * | 12/1997 | Wykes .................... 228/2.1 |
| 6,050,475 A | * | 4/2000 | Kinton et al. ............ 228/112.1 |
| 6,138,895 A | * | 10/2000 | Oelgoetz et al. ......... 228/112.1 |
| 6,247,633 B1 | * | 6/2001 | White et al. ............. 228/112.1 |
| 6,367,681 B1 | * | 4/2002 | Waldron et al. ......... 228/112.1 |
| 6,651,872 B2 | * | 11/2003 | Johnson et al. ........... 228/264 |
| 2003/0116608 A1 | * | 6/2003 | Litwinski ................ 228/112.1 |

FOREIGN PATENT DOCUMENTS

| | | |
|---|---|---|
| DE | 199 57 136 | 2/2001 |
| EP | 615 480 B1 | 11/1995 |
| EP | 0 830 914 | 3/1998 |
| EP | 0 968 788 | 1/2000 |
| EP | 1 029 627 | 8/2000 |
| EP | 1 048 390 | 11/2000 |
| EP | 1 149 656 | 10/2001 |
| EP | 1 153 694 | 11/2001 |

(List continued on next page.)

OTHER PUBLICATIONS

Patent Abstracts of Japan, Publication No. 2001079672, Mar. 27, 2001.
Patent Abstracts of Japan, Publication No. 2000246465, Sep. 12, 2000.
Patent Abstracts of Japan, Publication No. 2000042759, Feb. 15, 2000.

*Primary Examiner*—L. Edmondson

(57) ABSTRACT

A projection 3 is pressed into first and second members W1 and W2 with a predetermined pressure, while rotating a rotary tool 1 at a preset rotational speed, such that the first and second members W1 and W2 are sandwiched by the rotary tool 1 and stationary tool 10. The projection 3 rotates in these members to cut member textures around it, thereby generating heat. Furthermore, the cuttings formed by cutting with the projection 3 are accumulated in the members and agitated by the two tools 1 and 10, to collide against the surrounding member textures and the projection 3, thereby generating heat. Also, a first shoulder 2 is pressed in with a predetermined pressure and rotated to generate heat, thereby fusing the cuttings. While the plastic flow of the surrounding member textures is promoted, the first shoulder 2 is held at the predetermined pressure and rotational speed. The pressure per unit area is thus increased to increase the volume of plastic flow. When the rotary tool is pulled out while being rotated, the member textures that have been plastically flowing are cooled and joined to each other.

11 Claims, 20 Drawing Sheets

FOREIGN PATENT DOCUMENTS

| | | |
|---|---|---|
| JP | 2712838 | 10/1997 |
| JP | 10-183316 | 7/1998 |
| JP | 11-47959 | 2/1999 |
| JP | 2000-15426 | 1/2000 |
| JP | 2001-314982 | 11/2001 |
| JP | 2002-137067 | 5/2002 |
| JP | 2002-178168 | 6/2002 |
| WO | WO 99/34951 | 7/1999 |
| WO | WO 99/52669 A * | 10/1999 |
| WO | WO 01/17721 | 3/2001 |
| WO | WO 01/74526 | 10/2001 |

* cited by examiner

JOINING METHOD AND APPARATUS USING FRICTIONAL AGITATION

TECHNICAL FIELD

The present invention relates to a joining or bonding method and apparatus for fusing and agitating a metal member such as castings or a plate material by friction.

BACKGROUND ART

According to a conventional joining technique, plate materials, or metal members each press-molded in advance into a three-dimensional shape, are overlaid on each other, and are joined with each other by electrical resistance welding, arc welding, an adhesive, bolt fastening, rivets, or the like.

When the metal members have complicated three-dimensional shapes, spot welding that can locally join a plurality of discrete joining portions is used.

According to another joining technique, a joining method of performing frictional agitation in an unfused state is disclosed in Japanese Patent No. 2712838. According to this joining technique, a projection called a probe is inserted and translated, while being rotated, into a joining surface formed by abutting two members against each other. The metal textures in the vicinity of the joining surface are plasticized and joined by frictional heat.

Japanese Patent Laid-Open Nos. 10-183316 and 2000-15426 disclose a surface treating method in surface treating castings such as a contact surface of a cylinder head with respect to a cylinder block. According to this method, a rotary tool with a projection formed at the shoulder of its distal end is pressed into the casting while being rotated, so that agitation is performed when the casting is not fused by heat.

Frictional agitation joining in the unfused state described above has the following problems. The rotational speed and pressure of the rotary tool cannot be increased very high. As the area of that receiving surface of a stationary tool which abuts against the member is larger than that of the projection projecting from the distal end of the rotary tool, the pressure is dispersed over the entire surface of the receiving surface. The frictional heat generated by rotation of the rotary tool is dissipated over the entire surface of the receiving surface. Consequently, joining takes time.

Therefore, if the rotational speed of the tool, forcing amount of the tool, traveling speed of the tool, and the like are increased more than necessary, joining may become incomplete, or the joined portion may be undesirably fused. Hence, to shorten the joining time is limited.

According to the above conventional joining technique, control parameters such as rotational speed and forcing amount of the tool which are optimal for the thickness or material of the member are obtained in advance by an experiment or the like. When members different from those in the conventional case are to be joined due to a design change, optimal control parameters must be obtained again by an experiment or the like. Quality evaluation for the joining strength and the like is performed through a tensile test or the like by using a sample formed by actual joining. This requires a separate inspection process.

Therefore, if quality evaluation of actually joined members can be performed along with joining by using control parameters, quality evaluation of the members can be performed each time joining is performed. Thus, mass production can be coped with appropriately. Furthermore, when members different from those in conventional members are to be joined due to a design change, optimal control parameters can be calculated easily. This is very effective in improving the yield by suppressing defective products.

However, no system that evaluates the quality as described above in frictional agitation joining has been developed yet.

DISCLOSURE OF INVENTION

The present invention has been made in view of the above problems, and has as its object to provide a joining method and apparatus using frictional agitation, with which heat dissipation from the joined portion is suppressed and the joining time is shortened, so that the joined state can be stabilized.

It is another object of the present invention to provide a joining method and apparatus using frictional agitation, with which the joined state of members can be managed along with joining, so that a separate inspection process is not necessary.

In order to solve the above problems and to achieve the above objects according to the present invention, a joining method using frictional agitation of rotating a rotary tool which has a first tool portion and a second tool portion with an area smaller than that of the first tool portion and projecting from a distal end of the first tool portion, overlaying first and second members with each other, and performing agitation with friction, thereby joining the first and second members, comprises urging and pressing the rotary tool into the first member from the second tool portion while the rotary tool is being rotated, cutting the member around the rotary tool by rotating the rotary tool in the member into which the rotary tool has been pressed, fusing the cut member by agitation by the first tool portion with friction in the member, and extending the region to be fused to the second member to join the first and second members to each other.

When compared to conventional welding, a current and the like required for welding become unnecessary, so the joining time can be shortened.

Preferably, when joining is ended, the rotary tool is retracted in a rotating state from the members. Thus, the joined portion is cooled after that, and joining is completed.

Preferably, a stationary tool is arranged to oppose the rotary tool so that the first and second members are sandwiched by the stationary tool and rotary tool and such that a separation distance with respect to the rotary tool can be changed, and that distal end of the stationary tool which opposes the rotary tool is formed to have substantially the same area as that of a distal end of the second tool portion of the rotary tool. Thus, heat dissipation from the joined portion is suppressed, the joining time is shortened, and the joining strength can be increased.

Preferably, the joining method further comprises the joining management step of detecting a heat generating state of the members during joining, detecting a forced state of the rotary tool with respect to the members, detecting a joined state of the members from the heat generating state and forced state, and checking whether the joined state of the members is good or not from the joined state. Thus, the joined state of the members can be managed during joining, so a separate inspection process becomes unnecessary. Whether the members are joined well or not can be managed by using control parameters used during joining.

Preferably, a generated heat amount of the heat generating state is calculated on the basis of a coefficient of kinetic friction of the members and a load acting on the members, and a forcing amount of the forced state is calculated on the basis of an encoder output of a motor that vertically moves the rotary tool with respect to the members. Thus, the joined state of the members can be managed by using control parameters used during joining.

According to the present invention, a joining apparatus using frictional agitation of rotating a rotary tool which has a first tool portion and a second tool portion with an area smaller than that of the first tool portion and projecting from a distal end of the first tool portion, overlaying first and second members with each other, and performing agitation with friction, thereby joining the first and second members, comprises tool control means for urging and pressing the rotary tool into the first member from the second tool portion while the rotary tool is being rotated, cutting the member around the rotary tool by rotating the rotary tool in the member into which the rotary tool has been pressed, fusing the cut member by agitation of the first tool portion with friction in the member, and extending the region to be fused to the second member to join the first and second members to each other.

When compared to conventional welding, current and the like required for welding become unnecessary, so the joining time can be shortened.

Preferably, a stationary tool is arranged to oppose the rotary tool so that the first and second members are sandwiched by the stationary tool and rotary tool and such that a separation distance with respect to the rotary tool can be changed, and that distal end of the stationary tool which opposes the rotary tool is formed to have a sectional area smaller than at least that of a first tool portion of the rotary tool. Thus, heat dissipation from the joined portion is suppressed, the joining time is shortened, and the joined state is stabilized.

Preferably, the distal end of the stationary tool has substantially the same area as that of a distal end of the second tool portion of the rotary tool, and the stationary tool is formed such that the closer to a counter rotary tool side away from the distal end of the stationary tool, the larger the sectional area. When the distal end of the stationary tool wears, it can be cut and be used again.

Preferably, the distal end of the stationary tool forms a curved surface. Thus, stress concentration to the members and the sink can be decreased. Even if the angle with which the stationary tool abuts against the members slightly differs, the stationary tool is received by a surface and not by a point or line. Therefore, variations in joining strength can be suppressed, and a stable joining quality can be assured easily.

Preferably, the first tool portion has a shoulder which is concentric and with a decreasing diameter from the first tool portion toward the second tool portion so as to form a step. Thus, three or more overlaid members or members with a large total plate thickness can be joined.

Preferably, the joining apparatus further comprises a joining management unit comprising generated heat detection means for detecting a heat generating state of the members during joining, forced stated detection means for detecting a forced state of the rotary tool with respect to the members, joined state detection means for detecting a joined state of the members from the heat generating state and forced state, and checking means for checking whether the joined state of the members is good or not from the joined state. Thus, the joined state of the members can be managed during joining, and a separate inspection process becomes unnecessary.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BEST MODE FOR CARRYING OUT THE INVENTION

The embodiments of the present invention will be described in detail with reference to the accompanying drawings.

The embodiments to be described hereinafter are examples as means that implement the present invention. The present invention can be applied to those obtained by modifying or deforming the following embodiments within a range not departing from its spirit.

Joining Method Using Frictional Agitation

Figure 1A:
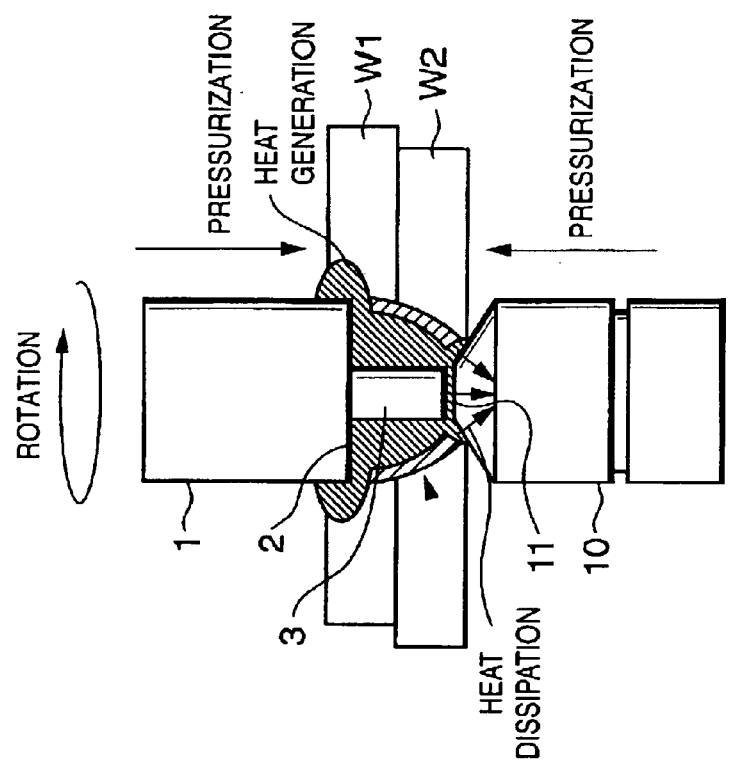
FIGS. 1A and 1B are illustrations for explaining a joining method using frictional agitation according to an embodiment of the present invention.
Figure 1B:
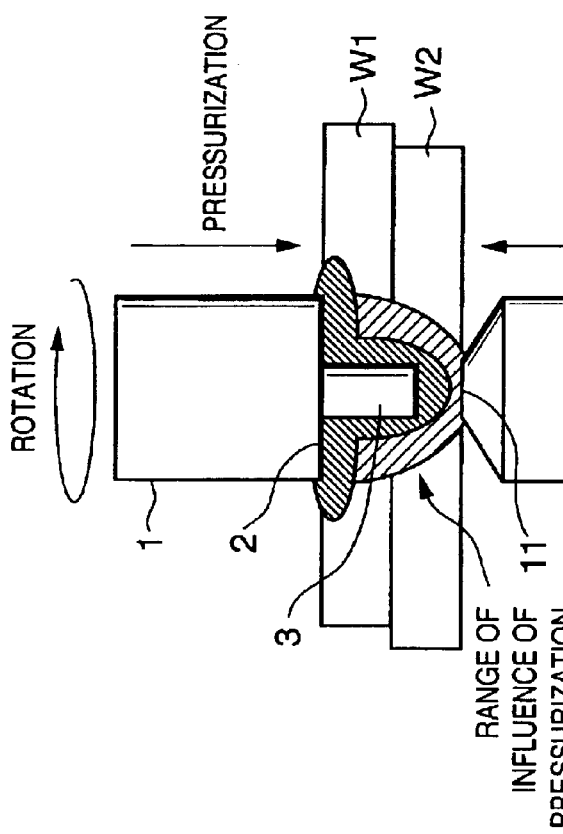

FIGS. 1A and 1B are illustrations for explaining a joining method using frictional agitation according to an embodiment of the present invention.

As shown in FIGS. 1A and 1B, the joining method shown in this embodiment is applied to joining plate-like members made of, e.g., an aluminum alloy. At least two members are overlaid, and a rotary tool 1 is pressed into a first member W1 on their outermost surface by applying a pressure to it while rotating (turning) it about its axis. Thus, the member textures of the first member W1 and a second member W2, which are overlaid on each other, are fused by a frictional heat and agitated, thereby joining them.

A stationary tool 10 is arranged to oppose the rotary tool 1 so that the first and second members W1 and W2 are sandwiched by the stationary tool 10 and rotary tool 1, and such that the separation distance with respect to the rotary tool 1 can be changed.

The rotary tool 1 is a wear-resistant tool made of a steel stock (e.g., a carbide alloy) with a hardness higher than that of the members. The material of the members is not limited to an aluminum alloy and suffices as far as it is softer than the rotary tool 1. The stationary tool 10 is made of, e.g., a steel stock or copper stock.

More specifically, the rotary tool 1 has a projection 3 projecting from a first shoulder 2 at its distal end. The projection 3 is pressed into the first and second members W1 and W2 with a predetermined pressure while rotating the rotary tool 1 with a preset rotational speed such that the first and second members W1 and W2 are sandwiched by the rotary tool 1 and stationary tool 10. As the projection 3 rotates in these members, the member textures around the projection 3 are cut to generate heat. Furthermore, the cuttings formed by cutting with the projection 3 are kept in the members by the two tools 1 and 10 and are agitated to collide against the surrounding member textures and the projection 3, thus generating heat. As the first shoulder 2 is pressed in with the predetermined pressure and rotated, it generates heat to fuse the cuttings. Thus, while the plastic flow of the member textures around the first shoulder 2 is being promoted, the first shoulder 2 is held with a predetermined pressure and rotational speed for a predetermined period of time. As a result, the pressure per unit area is increased to increase the volume of the plastic flow. When the rotary tool 1 is pulled out from the members while being rotated, the member textures which are in plastic flow are cooled and joined with each other.

When this joining process is performed continuously, the member textures attaching to around the projection 3 in the previous cycle are fused, and are supplied by agitation as a material in the next cycle.

At this time, the area of a receiving surface 11 of the stationary tool 10 is decreased, so while the pressure is increased, heat dissipation to the stationary tool 10 is suppressed, and the volume of plastic flow is increased, thereby increasing the joining force between the members.

The joining method according to this embodiment is suitable for local joining of lap joints (e.g., the outer panel of the rear door and its reinforcement) for vehicle steel plates press-molded in advance into three-dimensional shapes. More specifically, assume that members having complicated three-dimensional shapes due to press molding are to be joined at a plurality of discrete joining portions and that the rotary tool 1 cannot be moved continuously. In this case, if the joining method according to this embodiment is used, the members can be locally joined. Thus, joining is possible even after press molding.

According to this joining method, a welding current, cooling water, air, and the like used in conventional spot welding become unnecessary at all, so energy consumption necessary for joining can be reduced greatly. Since units and facilities serving as the energy source as described above become unnecessary, the facility investment can be reduced greatly.

A welding gun used in conventional spot welding can be used. Thus, abilities equivalent to or higher than in the prior art can be achieved easily regarding any one of the limitation on the joining members, joining strength, and production efficiency.

Figure 2A:
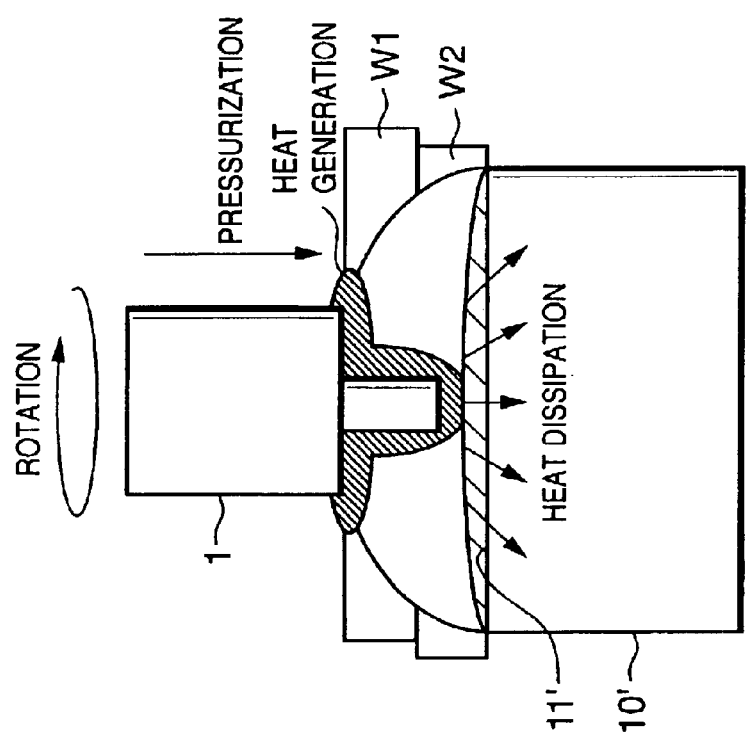
FIGS. 2A and 2B are illustrations for explaining a conventional unfused joining method using frictional agitation.
Figure 2B:
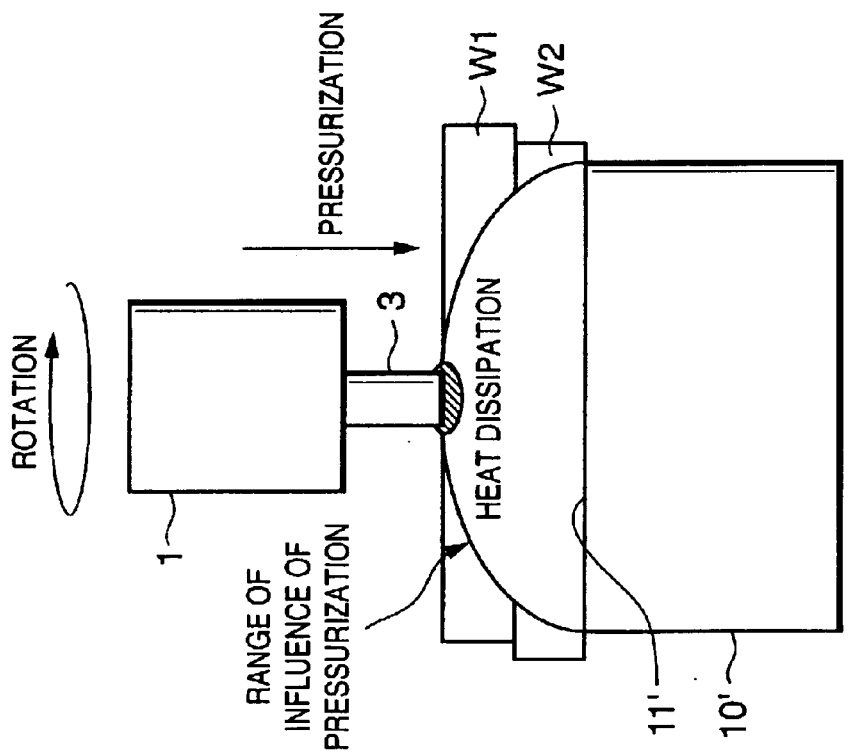

FIGS. 2A and 2B are illustrations for explaining a conventional unfused joining method using frictional agitation.

The conventional joining method shown in FIGS. 2A and 2B is identical to that of the present invention in its procedure of arranging first and second members W1 and W2 so as to be sandwiched by a rotary tool 1 and stationary tool 10' and pressing the rotary tool 1 into the first member W1 at the outermost surface by pressurization while rotating the rotary tool 1 around its axis, and is different from the present invention in that the member textures between the overlaid first and second members W1 and W2 are agitated while they are not fused by the frictional heat.

The state of unfused agitation means that the metal textures are agitated by softening them by a frictional heat at a temperature much lower than the fusion point which is the lowest among those of respective components or eutectic compounds contained in the matrix.

According to the conventional joining method, since the metal textures are agitated in the unfused state, problems such as a thermal strain occurring in electrical resistance welding and the like can be solved.

On the other hand, because of unfused frictional agitation, the rotational speed and pressure of the rotary tool 1 cannot be increased very high. As the area of that receiving surface 11' of the stationary tool 10' which abuts against the second member W2 is larger than that of a projection 3 projecting from the distal end of the rotary tool 1, the pressure is dispersed over the entire surface of the receiving surface 11'. Also, as the frictional heat generated by rotation of the rotary tool 1 is dissipated over the entire surface of the receiving surface 11', joining takes time (e.g., 2 to 3 seconds).

In contrast to this, according to the present invention, since frictional agitation is performed in the fused state, the rotational speed and pressure of the rotary tool 1 can be increased. Furthermore, the receiving surface 11 of the stationary tool 10 is formed to be smaller than at least the sectional area of the projection 3 of the rotary tool 1, so that heat dissipation is suppressed and the heat accumulation efficiency in the members is increased. As a result, fusion and plastic flow of the cuttings are promoted to shorten the time necessary for joining (e.g., to 0.3 to 0.5 sec).

Figure 3:
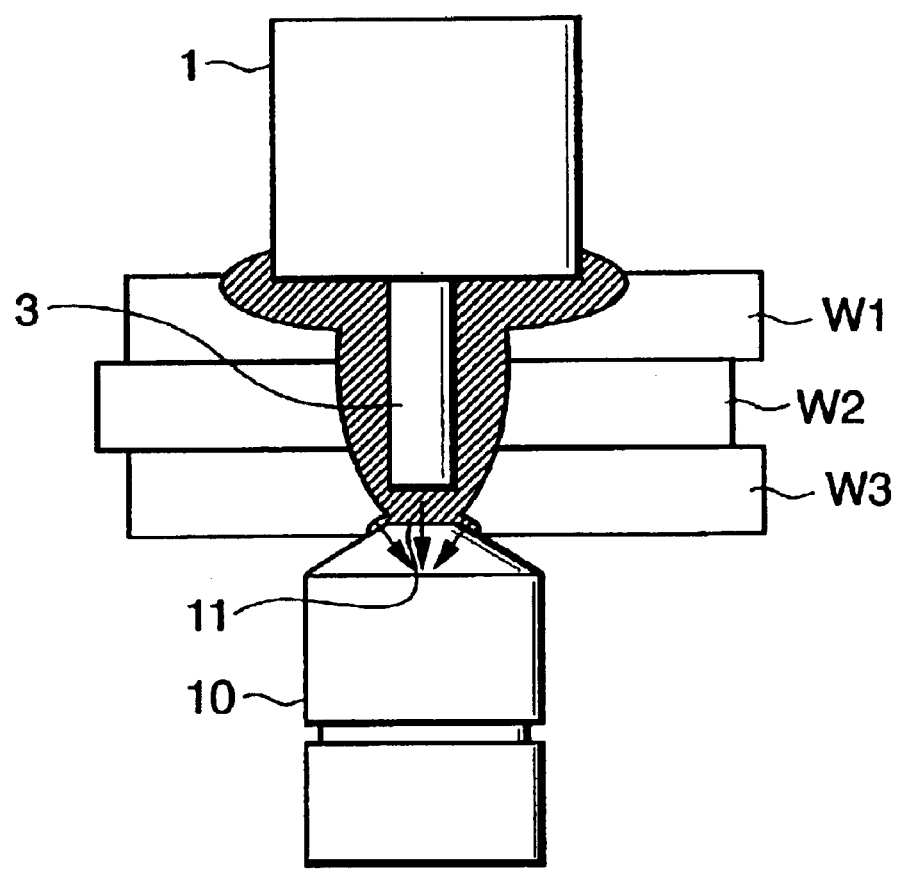
FIG. 3 is a view showing how joining is performed with a rotary tool having a projection with a length appropriate for joining three overlaid members.
Figure 4B:
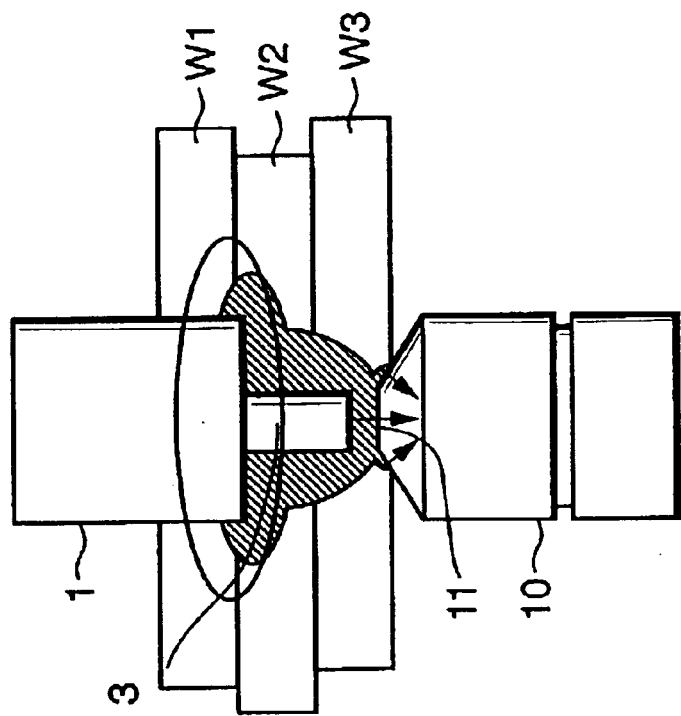
FIGS. 4A and 4B are views showing how joining is performed when three or more members are joined, while changing the time, by a rotary tool having a projection with a length appropriate for joining two overlaid members.
Figure 4A:
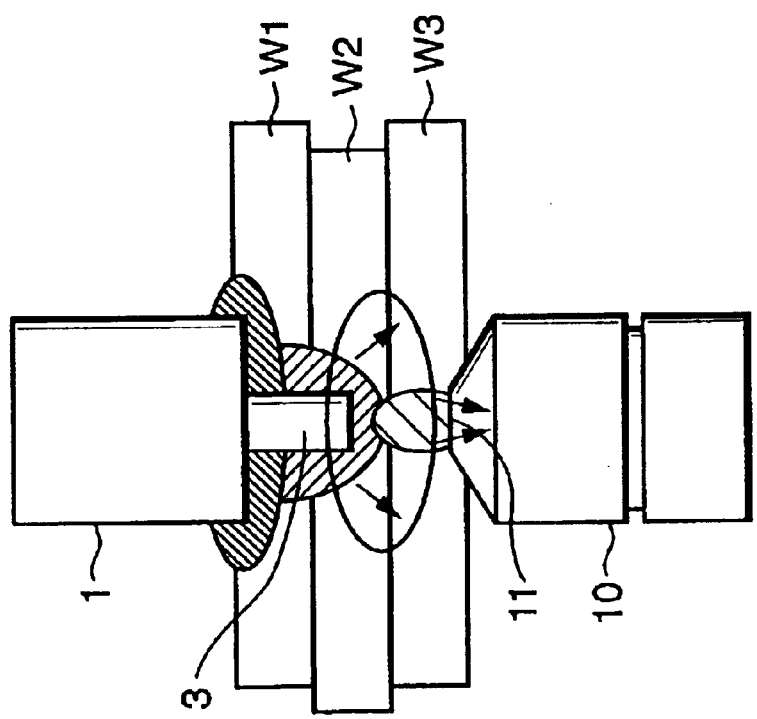

In addition, as shown in FIG. 3, the larger the number of overlaid members, the larger the total thickness of the members, and accordingly the length of the projection 3 of the rotary tool 1 must be increased in accordance with the number of overlaid members. For example, as shown in FIGS. 4A and 4B, assume that a rotary tool 1 having a projection 3 with a length appropriate for joining two overlaid members is applied to joining three overlaid members. In this case, if the joining time is shortened, the agitation amount of intermediate and lower members W2 and W3 becomes insufficient, and a sufficient strength cannot be assured (see FIG. 4A). Conversely, if the joining time is prolonged, the amount of decrease in plate thickness of an upper member W1 becomes excessively large, and a sufficient strength between the upper and intermediate members W1 and W2 cannot be assured (see FIG. 4B). In either case, a tool which is used when the number of overlaid members is small cannot be used for joining a large number of overlaid members.

Figure 5:
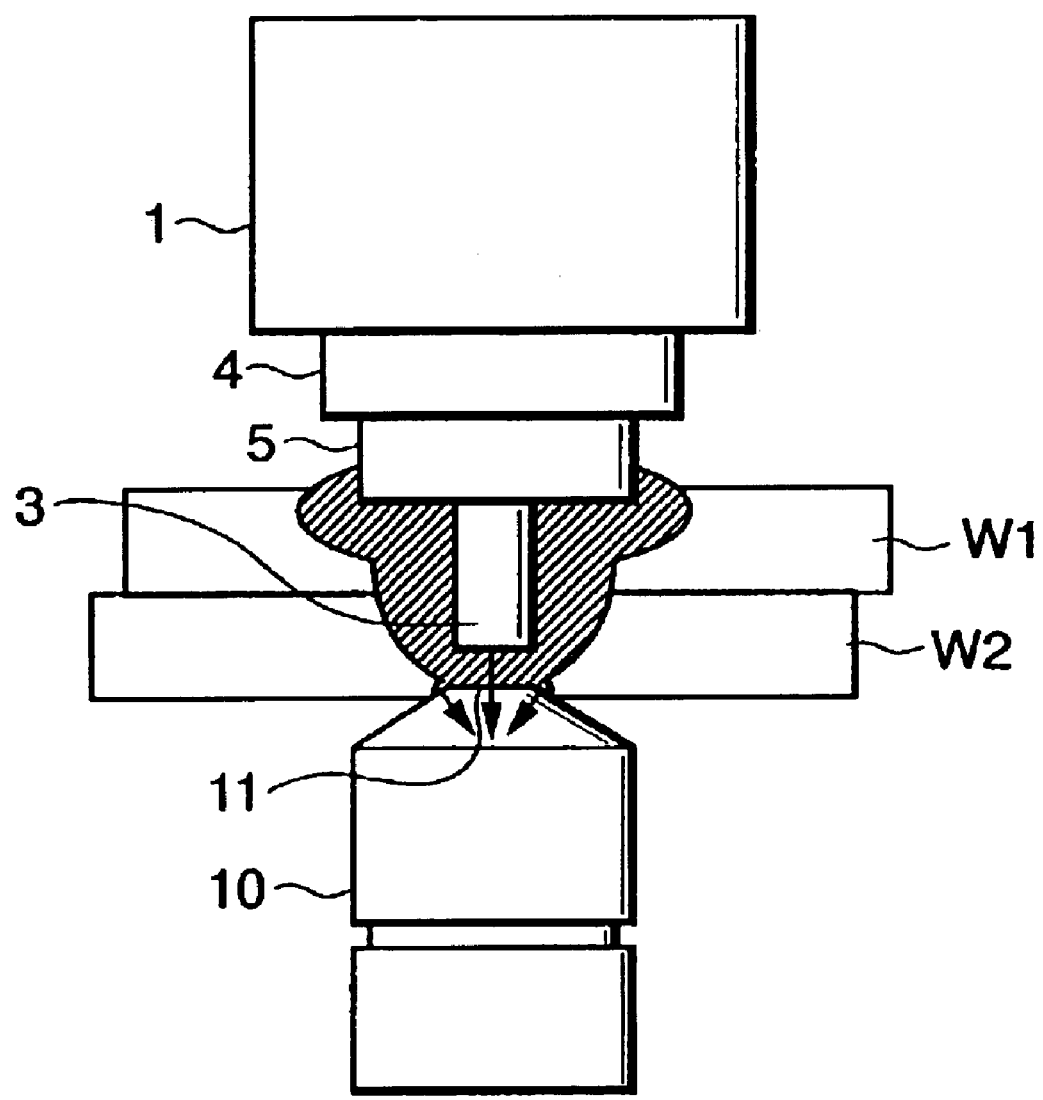
FIG. 5 is a view showing how joining is performed when two overlaid members are joined by a rotary tool according to the embodiment of the present invention.
Figure 6:
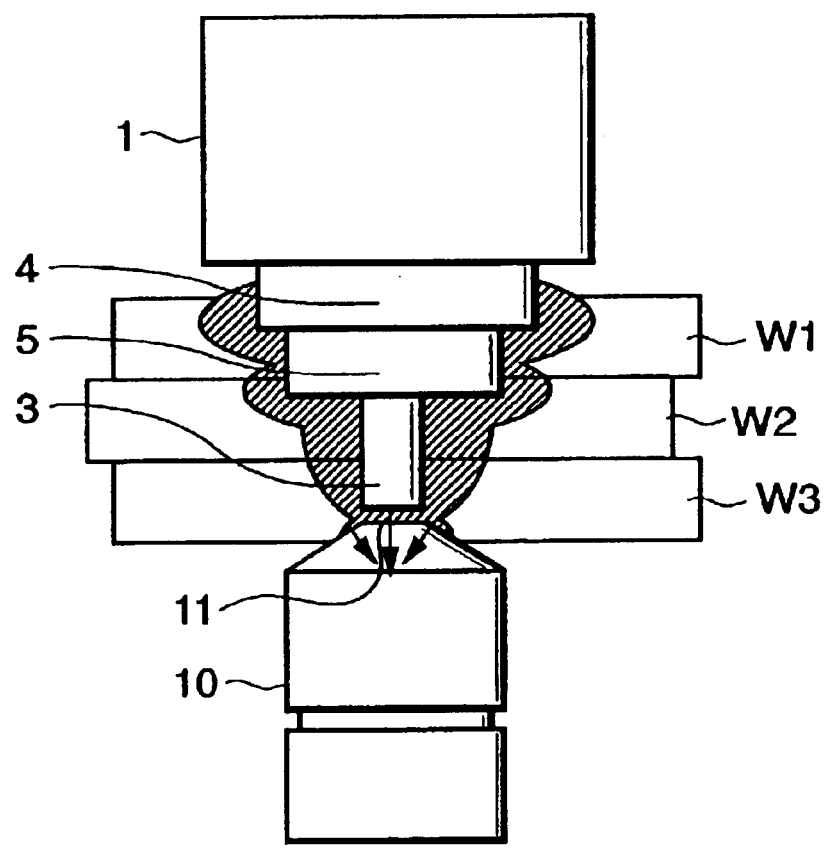
FIG. 6 is a view showing how joining is performed when three overlaid members are joined by the rotary tool according to the embodiment of the present invention.

In view of this, according to the present invention, as shown in FIGS. 5 and 6, second and third shoulders 4 and 5 are formed to be concentric and to have decreasing diameters from the distal end of a rotary tool 1 toward a projection 3 so as to form at least one step. Hence, while the length of the projection 3 is kept at the value appropriate for joining two overlaid members, three or more overlaid members or overlaid members with a large total thickness can be joined with each other.

Figure 7:
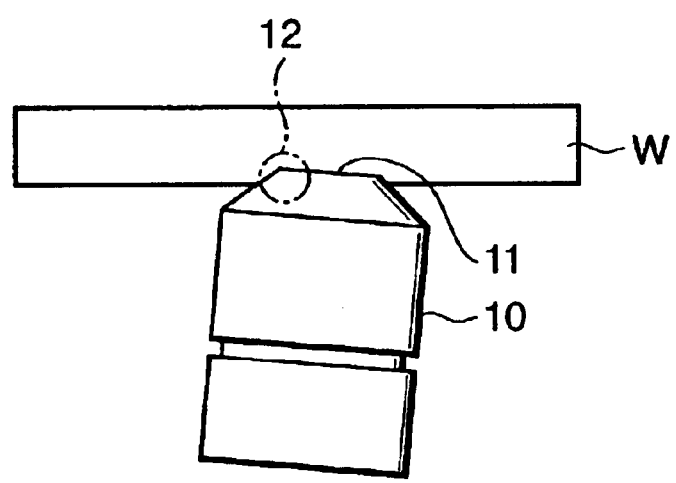
FIG. 7 is a view showing an influence on a member caused by pressurization of a stationary tool with a flat receiving surface.
Figure 8:
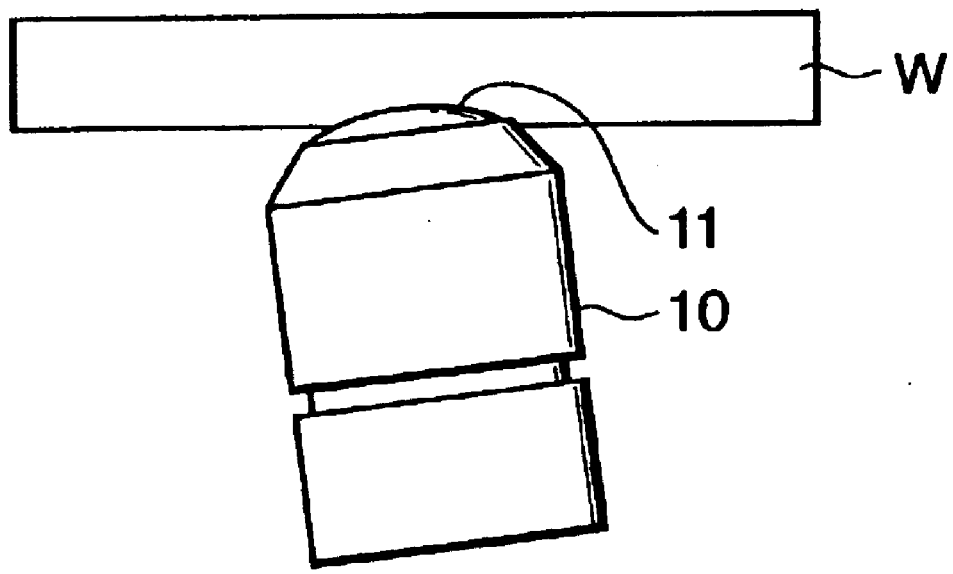
FIG. 8 is a view showing an influence on a member caused by pressurization of a stationary tool with a curved receiving surface.

The state of pressurization by the stationary tool 10 during joining will be considered. With a stationary tool 10 having a flat receiving surface 11 shown in FIG. 7, the stress is concentrated at a corner 12 of the receiving surface 11, and the sink amount of the stationary tool 10 into a member W increases. In view of this, according to the present invention, as shown in FIG. 8, the receiving surface 11 of the stationary tool 10 is curved to form a smooth corner 12, so that stress concentration to the member W and the sink are decreased. As the result of forming the receiving surface 11 curved, even if the angle with which the stationary tool 10 abuts against the member W slightly changes, the stationary tool 10 is received not by a point or line but by a surface. Therefore, variations in joining strength can be suppressed, and a stable joining quality can be assured easily.

Tool Used for Joining

Figure 9:
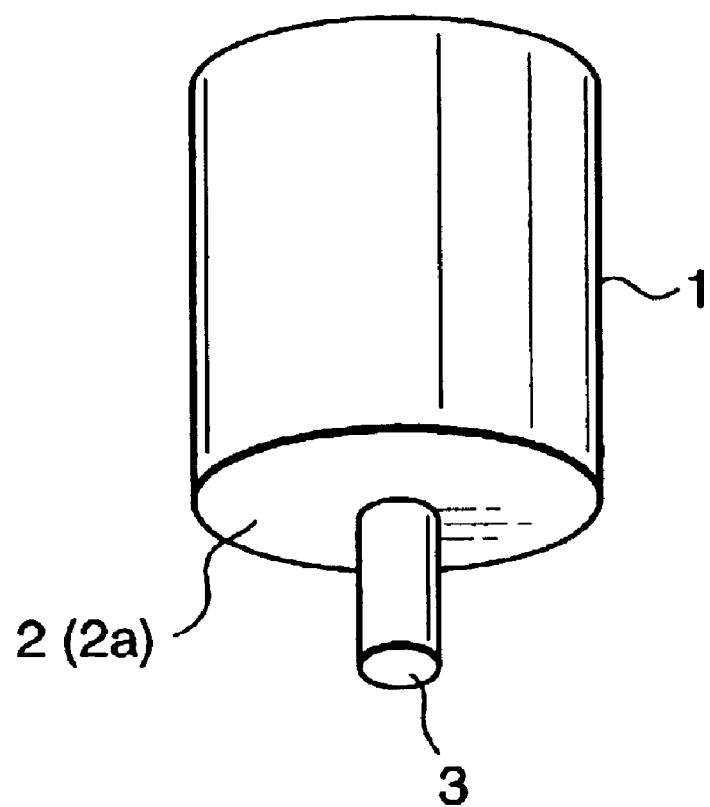
FIG. 9 is a view showing the outer appearance of a rotary tool used for frictional agitation joining according to an embodiment of the present invention.
Figure 10:
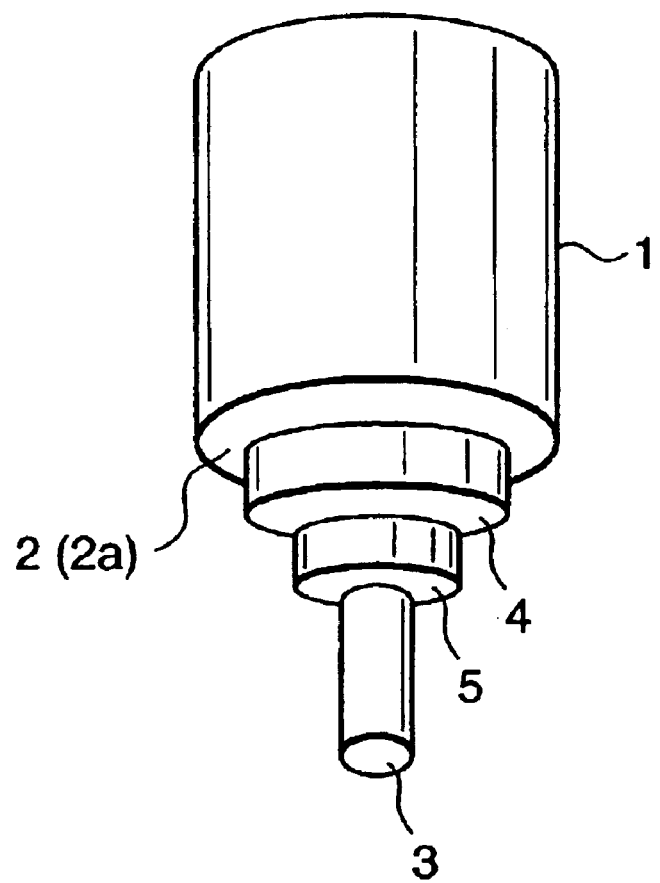
FIG. 10 is a view showing the outer appearance of a rotary tool used for frictional agitation joining according to an embodiment of the present invention.
Figure 11:
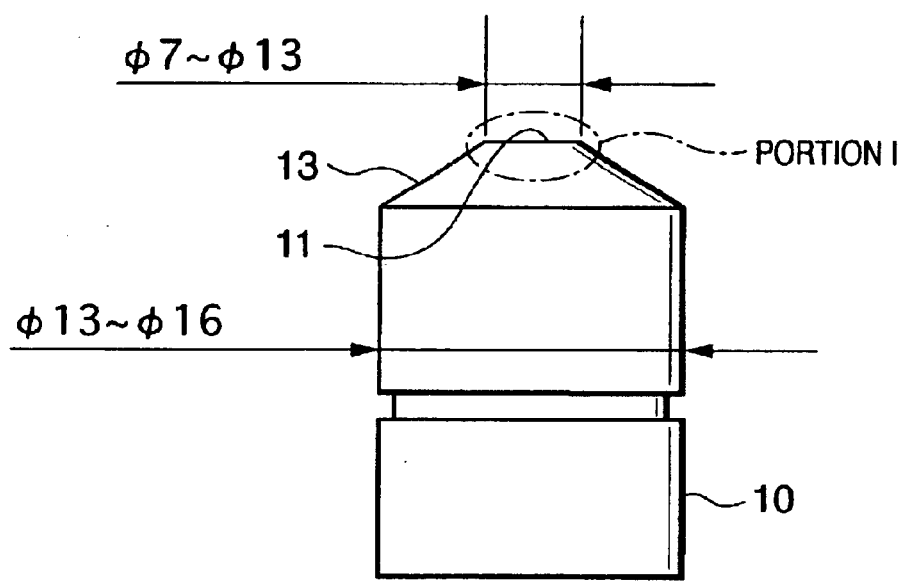
FIG. 11 is a front view of a stationary tool used for frictional agitation joining according to an embodiment of the present invention.

FIGS. 9 and 10 are views showing the outer appearances of rotary tools used for frictional agitation joining according to embodiments of the present invention. FIG. 11 is a front view of a stationary tool used for frictional agitation joining according to an embodiment of the present invention.

The rotary tool shown in FIG. 9 is used for joining approximately two overlaid members with a comparatively small total thickness. This rotary tool has a cylindrical first shoulder 2 (corresponding to a first tool portion), and a cylindrical projection 3 (corresponding to a second tool portion) with a diameter (or a sectional area) smaller than that of the first shoulder 2 and coaxially projecting from a distal end 2a of the first shoulder 2.

The rotary tool shown in FIG. 10 is used for joining three or more overlaid members with a large total thickness, and has a cylindrical first shoulder 2, a cylindrical projection 3 with a smaller diameter (or a smaller sectional area) than that of the first shoulder 2 and coaxially projecting from a distal end 2a of the first shoulder 2, and cylindrical second and third shoulders 4 and 5 which are concentric and have gradually decreasing diameters from the first shoulder 2 toward the projection 3 as to form a step.

In the rotary tool shown in FIG. 9, the diameter of the first shoulder 2 is set to about 5 mm to 13 mm, and that of the projection 3 is set to about 2 mm to 5 mm.

In the rotary tool shown in FIG. 10, the diameter of the first shoulder 2 is set to about 13 mm to 16 mm, that of the second shoulder 4 is set to about 10 mm to 13 mm, that of the third shoulder 5 is set to about 5 mm to 10 mm, and that of the projection 3 is set to about 2 mm to 5 mm.

To further improve the cutting performance and agitating performance, helical or parallel grooves may be formed in the outer surface of the projection 3. When helical grooves are to be formed, they may be formed in a direction in which the member textures are urged into the members.

A stationary tool 10 shown in FIG. 11 has a large-diameter portion 13 which is tapered such that the closer to the counter rotary tool side away from a receiving surface 11, the larger the sectional area. The receiving surface 11 (portion I) forms a curved surface with a curvature of about 30 mm to 50 mm so that it can absorb the shift of a point where the pressure acts with respect to the projection 3.

If the rotary tool is formed as shown in FIG. 10, when joining various types of overlaid members and members with various total thicknesses, it can be performed without exchanging the tool, and a loss in joining time which occurs in conventional tool exchange can be reduced. As the number of types of tools to be used is also reduced, costs for purchasing/machining the tool and for maintaining and managing the tool can be reduced.

As shown in FIG. 11, in the stationary tool 10, the diameter of the receiving surface 11 is about 7 mm to 13 mm, that of the large-diameter portion of the large-diameter portion 13 is about 13 mm to 16 mm, and that of the small-diameter portion increases from the receiving surface 11 to the large-diameter portion 13 in a taper manner in accordance with the respective sizes. As the large-diameter portion 13 is tapered, when the distal end of the stationary tool wears, it can be cut and be used again.

Figure 12:
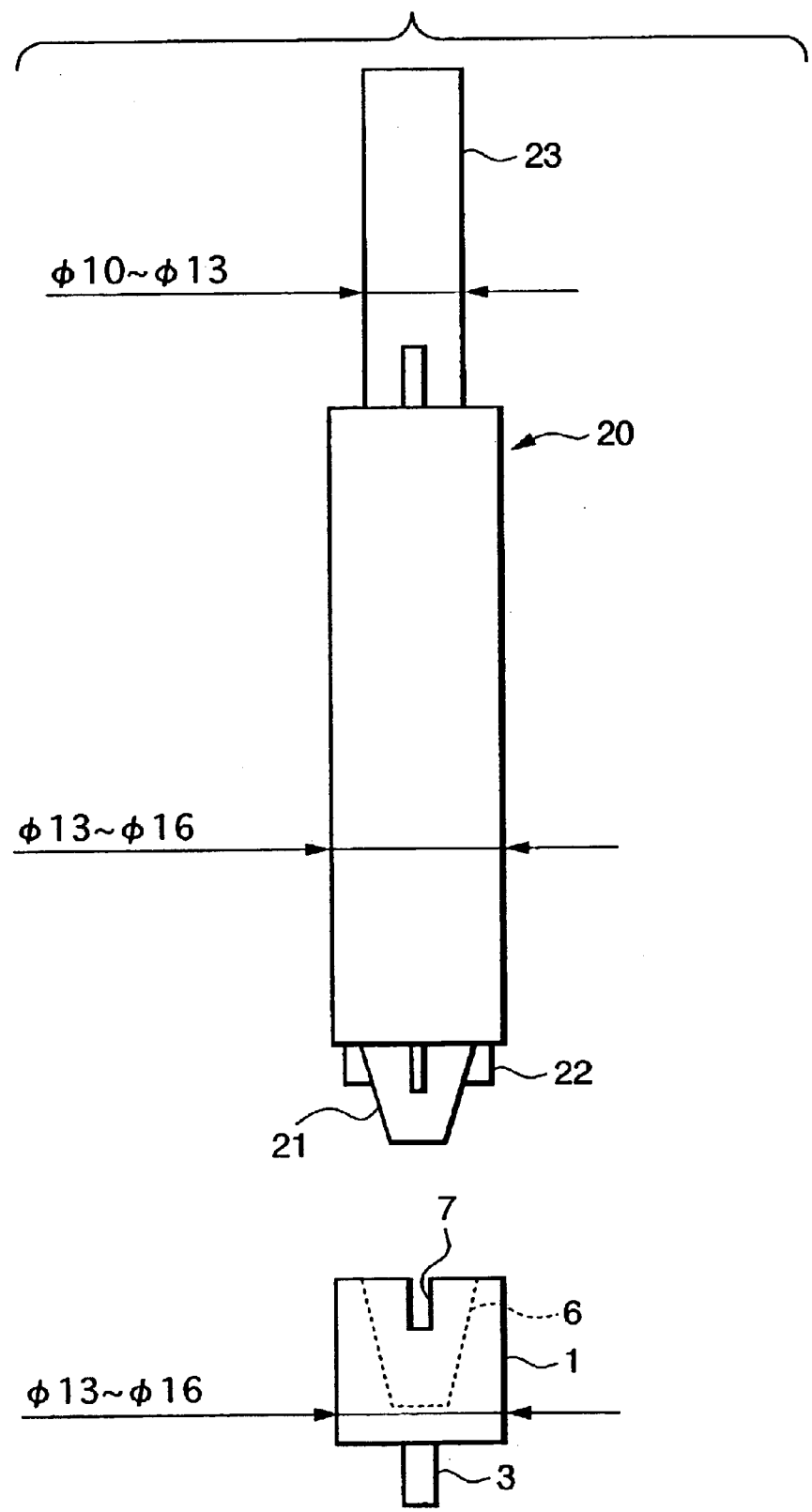
FIG. 12 is a front view showing a rotary tool and an attaching bracket for the rotary tool.

FIG. 12 is a front view showing a rotary tool and an attaching bracket for the rotary tool.

As shown in FIG. 12, a rotary tool 1 has a taper hole 6 in its counter projection 3 side end face to be thinner toward its distal end. Rotation preventive guide grooves 7 are formed around the taper hole 6 equidistantly (e.g., at every 90° around the axis). The rotary tool 1 side end face of an attaching bracket 20 is tapered to be thinner toward its distal end, and rotation preventive guides 22 to fit in the rotation preventive guide grooves 7 project around a taper surface 21 of the attaching bracket 20.

The taper hole 6 and rotation preventive guide grooves 7 of the rotary tool 1 respectively fit with the taper surface 21 and rotation preventive guides 22 of the attaching bracket 20, so the rotary tool 1 and attaching bracket 20 are fixed with each other. Since the rotation preventive guide grooves 7 and rotation preventive guides 22 fit with each other, the rotary tool 1 and attaching bracket 20 do not rotate relative to each other.

The attaching bracket 20 is formed such that when it is fixed with the rotary tool 1, they integrally form a shaft with substantially the same diameter of about 13 mm to 16 mm. The length of the attaching bracket 20 is set to match the members to be joined. A robot mounting portion 23 with a diameter of about 10 mm to 13 mm extends from the counter rotary tool side end face of the attaching bracket 20. The robot mounting portion 23 is attached to the motor shaft of an articulated robot (not shown) through a holder or the like, so it is driven to rotate together with the rotary tool 1.

Figure 13:
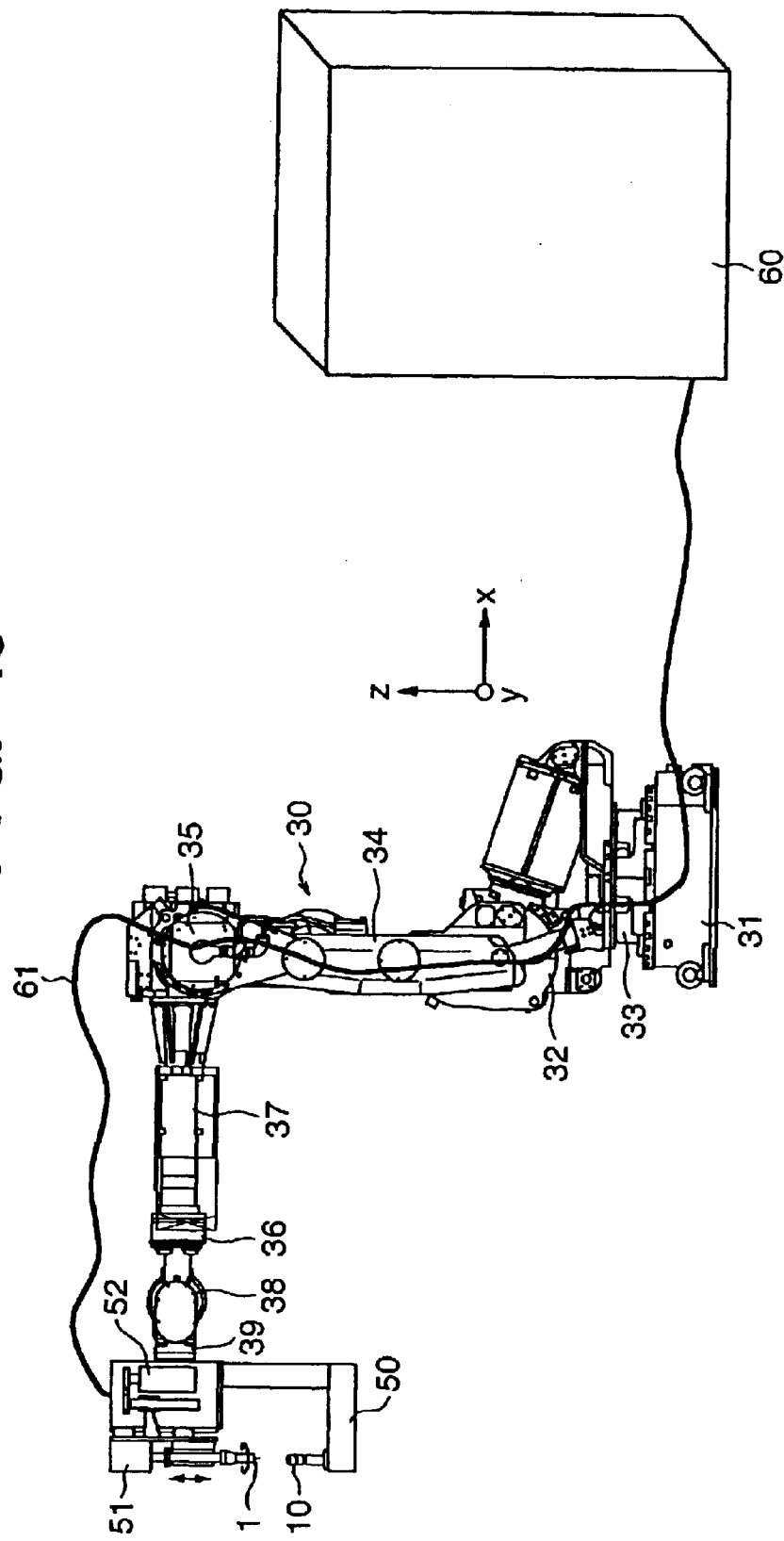
FIG. 13 is a schematic view of an articulated robot which fixes and drives the rotary tool.

FIG. 13 is a schematic view of the articulated robot which fixes and drives the rotary tool.

As shown in FIG. 13, an articulated robot 30 has first, second, and third arms 34, 37, and 39. The first arm 34 is connected to a joint 32 formed on a base 31, swings about the y-axis, and rotates at a joint 33 about the z-axis. The second arm 37 is connected to the first arm 34 through a joint 35, swings about the y-axis, and rotates at a joint 36 about the x-axis. The third arm 39 is connected to the second arm 37 through a joint 38, and swings about the y-axis.

A joining gun 50 is attached to the distal end of the third arm 39. The rotary tool 1 is rotatably attached to the joining gun 50. A motor 51 for rotatably driving the rotary tool 1 and the stationary tool 10 opposing the rotary tool 1 are attached to the joining gun 50. The distance between the rotary tool 1 and stationary tool 10 can be changed by an actuator 52. The pressure against the members during joining and the rotational speed of the tool are controlled, so three or more overlaid joining can be coped with.

The operations of the respective arms, motor, and actuator of the articulated robot 30 are taught in advance and controlled by a robot controller 60 through a power/control cable 61.

Figure 14:
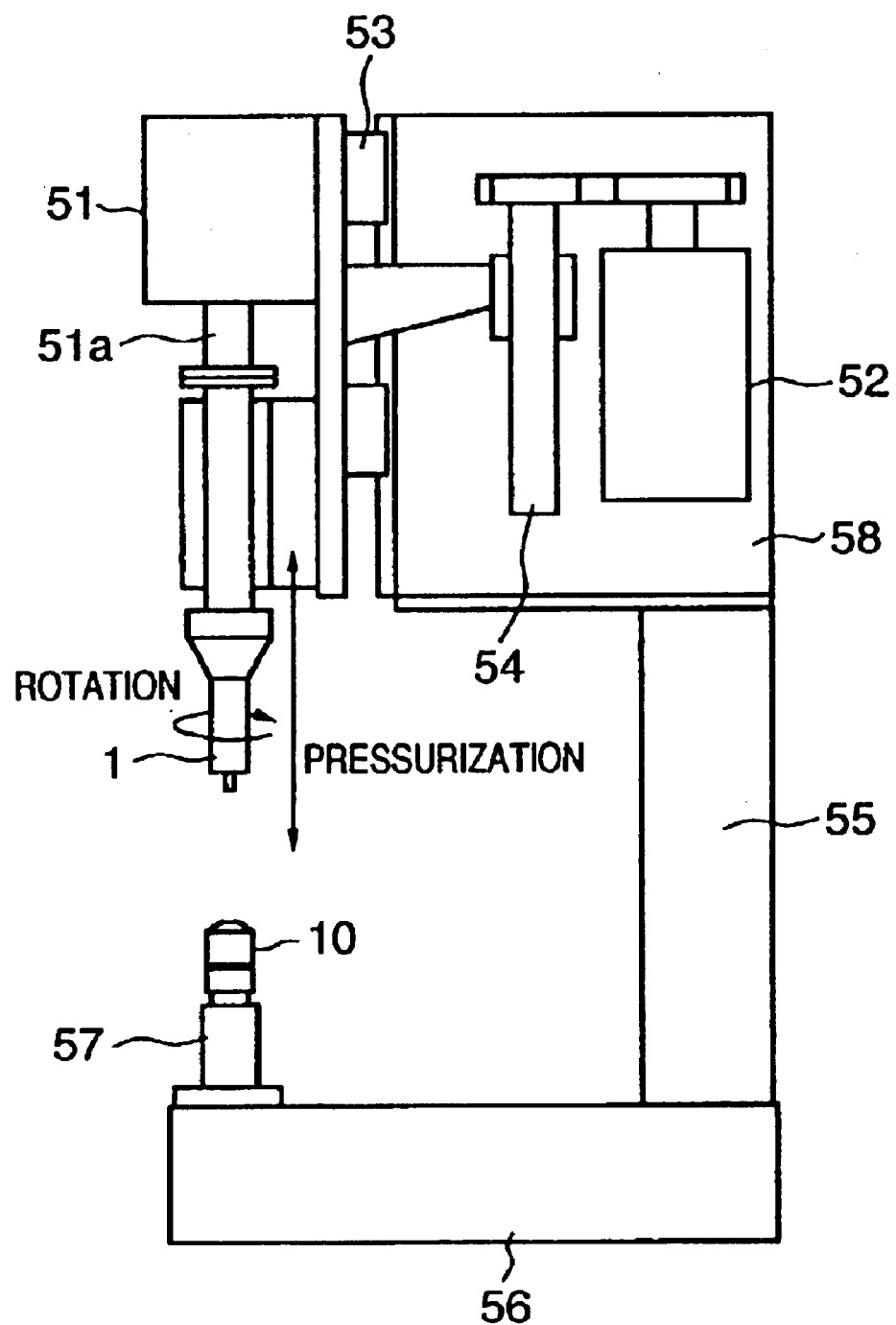
FIG. 14 is a detailed view of the joining gun shown in FIG. 13.

FIG. 14 is a detailed view of the joining gun shown in FIG. 13.

As shown in FIG. 14, in the joining gun 50, the stationary tool 10 is attached to a lower end arm 56, extending horizontally from the lower end of a gun arm 55, through an attaching bracket 57.

A driving unit 58 for rotating the rotary tool 1 and driving it vertically is attached to the upper end of the gun arm 55. The driving unit 58 has a guide table 53 vertically guided by a ball screw mechanism 54 driven by the vertical driving motor 52 as the driving source. The rotary driving motor 51 is fixed to the guide table 53. The rotary tool 1 is attached to a rotating shaft 51a of the rotary driving motor 51 through a holder or the like, and opposes the stationary tool 10.

The rotary tool 1 can be vertically moved by the movement of the guide table 53 which is moved by the vertical driving motor 52 and ball screw mechanism 54, and is rotatably driven by the rotary driving motor 51.

According to this embodiment, defective joining caused by facility abnormalities is prevented by means of the control parameters of the above joining facility (joining gun, rotary driving motor, vertical driving motor, rotary tool, and the like). The generated heat amount is calculated from the coefficient of kinetic friction of the members to be joined and the load (pressure, rotational speed, tool contact diameter, and the like) to be applied to the members. The joining quality is checked during joining from the relationship between the generated heat amount and the forcing amount (amount of decrease in plate thickness) of the rotary tool into the members. All joining can be inspected in a nondestructive manner. Whether quality guarantee can be performed can be determined within the manufacturing line (in-line).

Joining Control

A joining control method by means of frictional agitation according to this embodiment will be described.

Figure 15:
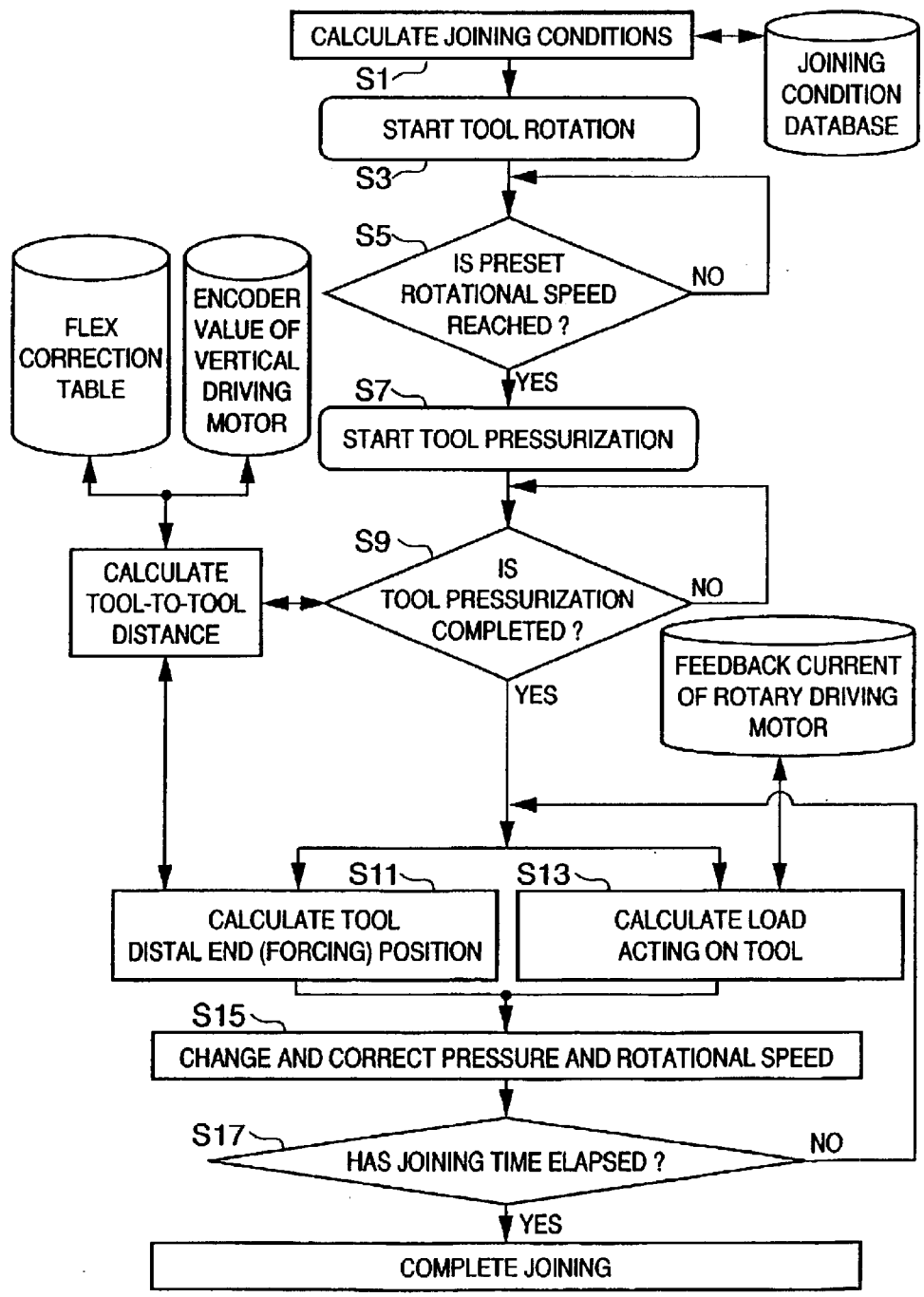
FIG. 15 is a flow chart for explaining a joining control method which uses frictional agitation according to this embodiment.

FIG. 15 is a flow chart for explaining the joining control method by means of frictional agitation according to this embodiment.

As shown in FIG. 15, in step S1, suitable joining conditions are calculated, on the basis of the combination of the materials to be joined and the plate thickness, by using a database where joining conditions such as the rotational speed and pressure of the rotary tool, the joining time, and the like are set in advance through experiments or the like.

In step S3, rotary driving of the rotary tool is started.

In step S5, the rotary tool waits for a preset rotational speed. If the rotary tool reaches the preset rotational speed, the flow advances to step S7. The rotary tool is moved down to start pressurizing the members. The rotational speed of the tool is calculated from the encoder value of the rotary driving motor. The pressure is calculated from the feedback current value of the vertical driving motor. The tool-to-tool distance between the rotary tool and stationary tool is calculated from the gun arm flex correction table preset in advance through experiments or the like and the encoder value of the vertical driving motor.

In step S9, if the rotary tool reaches a preset pressure and it is detected from the tool-to-tool distance that pressing of the projection of the rotary tool into the members is completed, the rotary tool rotates with its shoulder being in contact with the members, and generates heat.

In step S11, the tool distal end position (forcing amount) of the projection 3 with respect to the members is calculated. Simultaneously, in step S13, the load acting on the rotary tool is calculated.

The tool distal end position (forcing amount) of the rotary tool is calculated from the tool-to-tool distance. The load acting on the rotary tool is calculated from the feedback current value of the rotary driving motor.

In step S15, the amount of decrease in plate thickness of the upper member is calculated while monitoring the tool-to-tool distance. When the amount of decrease exceeds a predetermined reference value, the joining conditions (pressure, rotational speed) are corrected or changed, so that a decrease in plate thickness that might lead to defective joining (decrease in joining strength) is reduced. Also, the joining conditions (pressure, rotational speed) are corrected or changed so as to match the tool distal end position of the rotary tool calculated in step S13.

In step S17, under the joining conditions corrected (changed) in step S15, the joining process of steps S13 to S17 is held until reaching the joining time set in step S1. When the joining time has elapsed, joining is completed.

The above pressure is controlled by setting the relationship between the pressure at the distal end of the tool and the current value of the vertical driving motor required at that time on a table in advance, and calculating a pressure correction expression in accordance with this table. The feedback current of the vertical driving motor during pressurization is detected. The pressure can be calculated from the feedback current value and the pressure correction expression.

Figure 19:
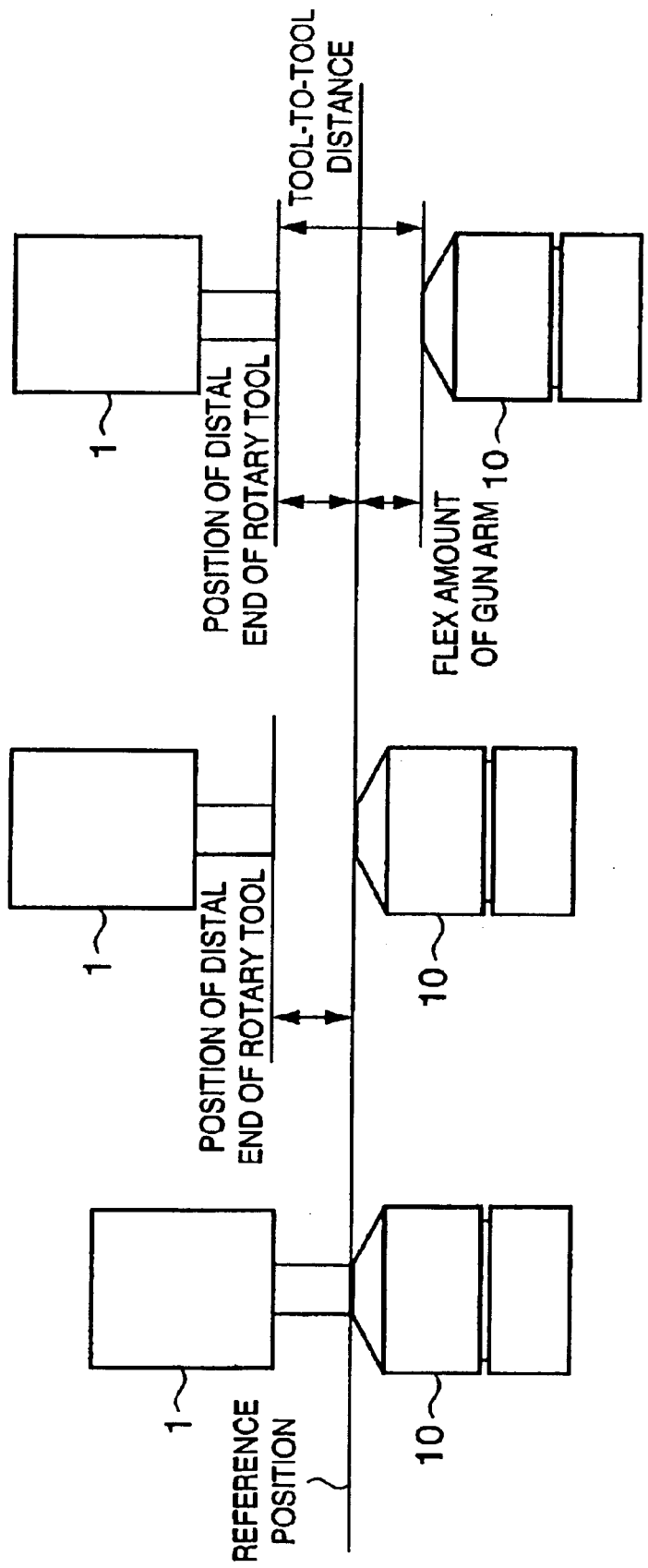
FIG. 19 is a view for explaining the relationship among the position of the distal end of the tool, the tool-to-tool distance, and the flex amount of the gun arm.

As shown in FIG. 19, the tool distal end position (forcing amount) of the rotary tool is calculated by comparing the encoder value of the vertical driving motor at the reference position when the above deficiency is confirmed with the encoder value of this motor at the position where the rotary tool is currently located. The tool-to-tool distance is calculated in the following manner. The relationship between the pressure and the flex amount of the gun arm is set as shown in FIG. 19 on a table in advance. The flex correction expression is obtained from this table. The pressure generated during joining is calculated from the feedback current value of the vertical driving motor and the flex correction expression. The flex amount of the gun arm obtained when pressurization is performed with this pressure is calculated from the flex correction expression. The tool-to-tool distance is calculated from the relationship between the flex amount of the gun arm and the tool distal end position of the rotary tool.

In the above control operation, the joining time may be changed in accordance with the load applied to the rotary tool.

According to this embodiment, the joined state is detected from the tool distal end position and the load. The joining conditions (pressure, rotational speed, joining time) suitable for this joined state are controlled. Hence, plastic flow suitable for the combination of the materials to be joined and the plate thickness is caused, so that defective joining is decreased, and a stable joining quality can be assured.

Quality Guaranteeing Method

A quality guaranteeing method in the joining method using frictional agitation according to this embodiment will be described.

Figure 16A:
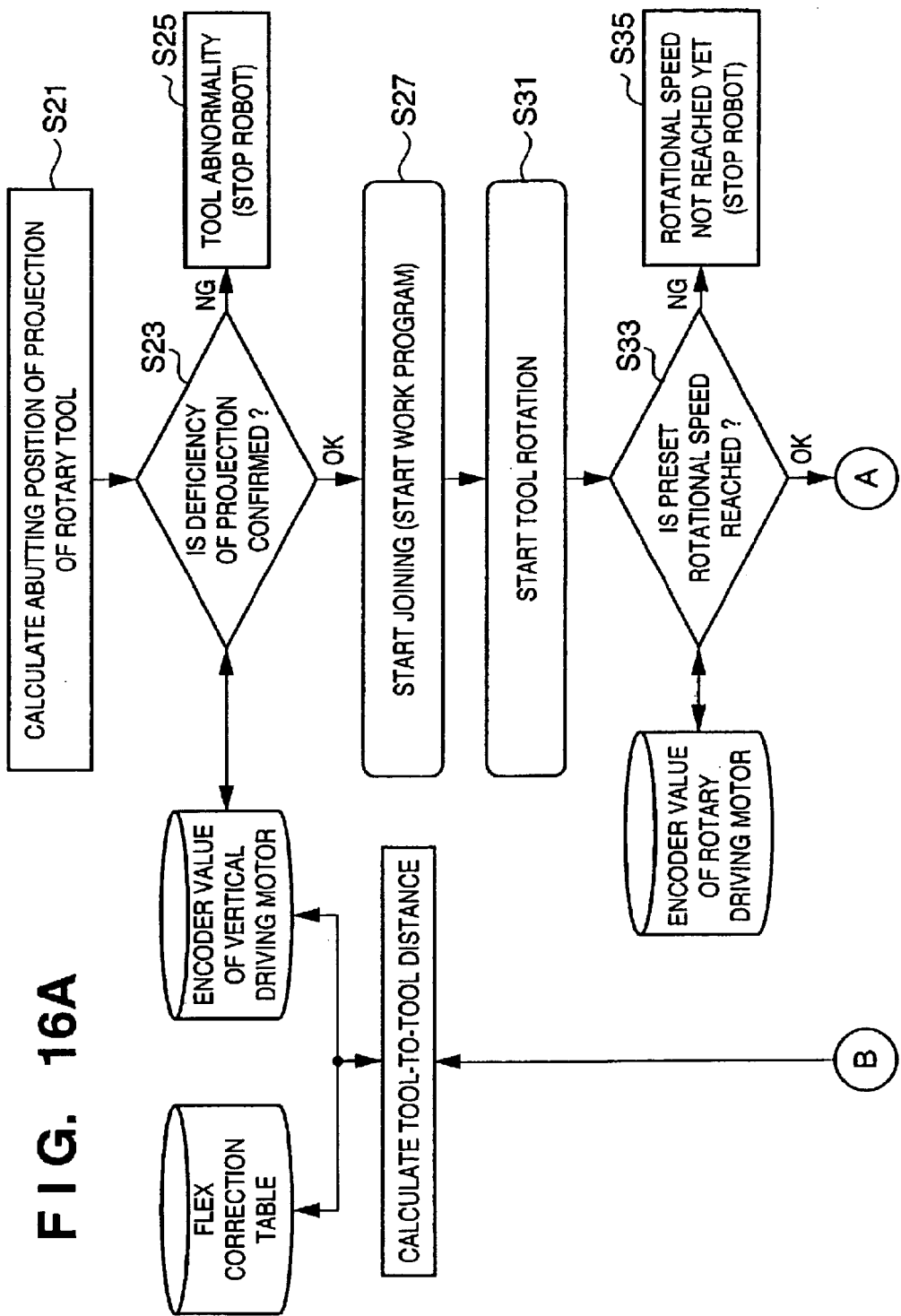
FIGS. 16A and 16B are flow charts for explaining a quality guaranteeing method in a frictional agitation joining method according to this embodiment.
Figure 16B:
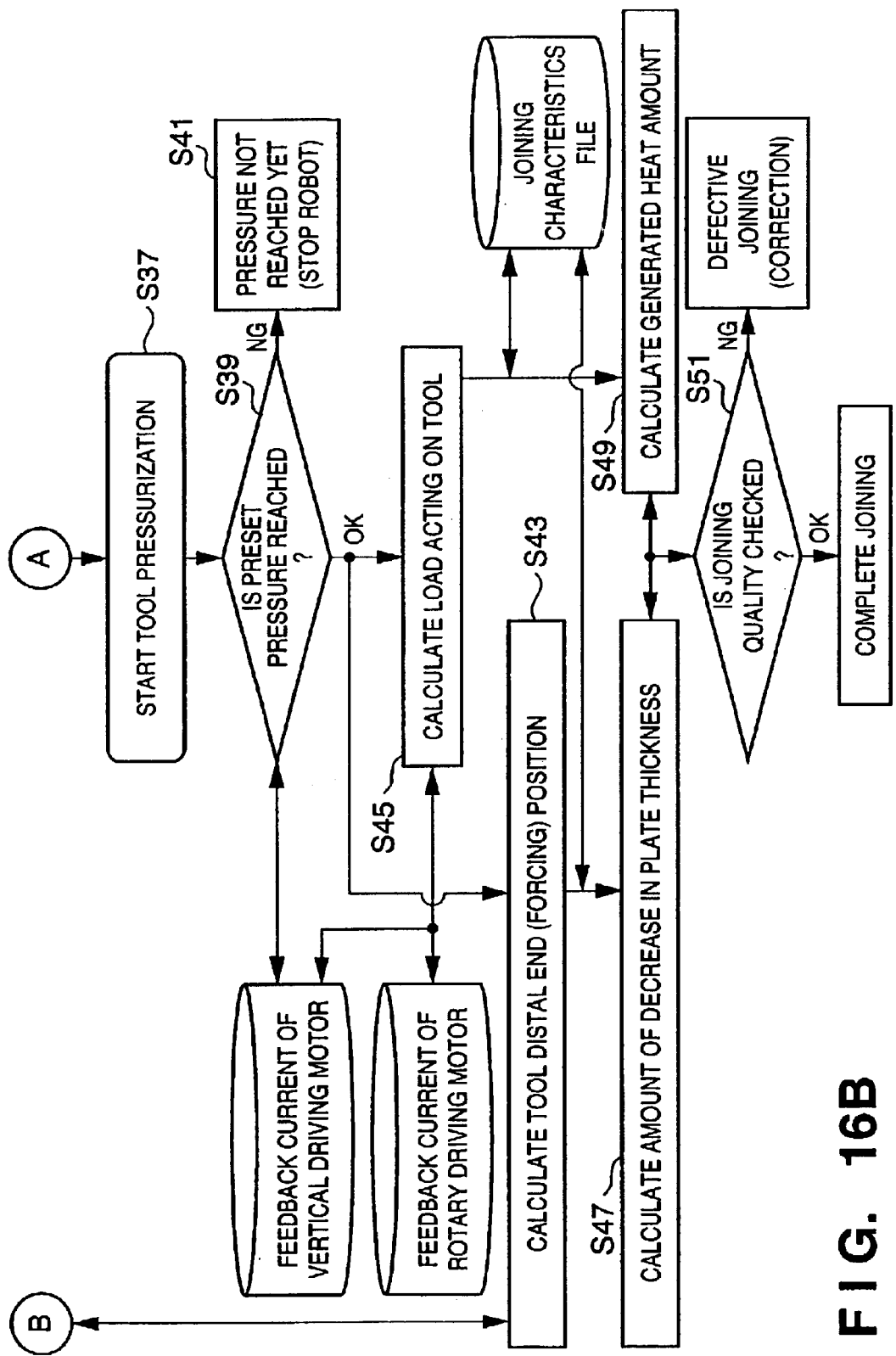

FIGS. 16A and 16B are flow charts for explaining the quality guaranteeing method in the frictional agitation joining method according to this embodiment.

As shown in FIGS. 16A and 16B, in step S21, before actual joining is started, the position where the projection 3 of the rotary tool 1 abuts against the member not through the member is calculated.

In step S23, the abutting position calculated in step S21 is compared with the predetermined reference position, so that checking of a deficiency caused by the wear of the projection 3 of the rotary tool 1 is performed.

Regarding the reference position, by using a new rotary tool 1 with no deficiency, the position where the rotary tool 1 comes into contact with the stationary tool 10 and reaches the predetermined pressure is defined as the reference position. When the abutting position exceeds the reference position by a predetermined amount, it is determined that a deficiency occurs.

When it is determined in step S23 that the projection 3 has a deficiency, the flow advances to step S25. It is determined that an abnormality occurs, and a subsequent robot operation is stopped.

Through deficiency checking of step S23, if it is determined that no deficiency occurs, this program is started in step S27, and the joining process is started.

In step S31, rotary driving of the rotary tool is started.

In step S33, if it is determined from the encoder value of the rotary driving motor that the rotary tool has reached the preset rotational speed, the flow advances to step S37. The rotary tool 1 is moved downward to start pressurizing the members. If the rotary tool 1 does not reach the preset rotational speed after the lapse of a predetermined period of time, this is determined as an abnormality in step S35, and a subsequent robot operation is stopped.

In step S39, if the rotary tool has reached the preset pressure, it is rotated with its shoulder being in contact with the members, thus starting to generate heat. In step S43, the tool distal end position (forcing amount) of the projection 3 with respect to the members is calculated. Simultaneously, in step S45, the load acting on the rotary tool is calculated. If the rotary tool does not reach the preset pressure after the lapse of the predetermined period of time, this is determined as an abnormality in step S41, and a subsequent robot operation is stopped.

The above pressure is controlled by setting the relationship between the pressure at the distal end of the tool and the current value of the vertical driving motor required at that time on a table in advance, and calculating a pressure correction expression in accordance with this table. The feedback current of the vertical driving motor during pressurization is detected. The pressure can be calculated from the feedback current value and the pressure correction expression.

As shown in FIG. 19, the tool distal end position (forcing amount) of the rotary tool is calculated by comparing the encoder value of the vertical driving motor at the reference position when the above deficiency is confirmed with the encoder value of this motor at the position where the rotary tool is currently located. The tool-to-tool distance is calculated in the following manner. The relationship between the pressure and the flex amount of the gun arm is set as shown in FIG. 19 on a table in advance. The flex correction expression is obtained from this table. The pressure generated during joining is calculated from the feedback current value of the vertical driving motor and the flex correction expression. The flex amount of the gun arm obtained when pressurization is performed with this pressure is calculated from the flex correction expression. The tool-to-tool distance is calculated from the relationship between the flex amount of the gun arm and the tool distal end position of the rotary tool.

The load acting on the rotary tool is obtained in the following manner. The reference currents for the respective rotational speeds are set on a table in advance from the relationship between the feedback current value of the rotary driving motor without any load and the rotational speed detected by the encoder of the rotary driving motor. A reference current calculation expression is obtained from this table. The load acting on the rotary tool is calculated from Expression 1 about the reference current obtained by this reference current calculation expression and the feedback current value of the rotary driving motor obtained during joining.

(Load during joining)=(feedback current value of rotary driving motor during joining)−(reference current)  (Expression 1)

In step S47, the amount of decrease in plate thickness of the members caused by pressurization is calculated from the tool distal end position of the rotary tool and the joining characteristics file (see FIG. 18) stored in advance.

In step 49, the amount of heat generated by frictional agitation is calculated from the load or pressure, the rotational speed of the tool, the surface resistance (coefficient of kinetic friction) of the members, and the contact diameter of the tool.

In step S51, the joining quality is determined while monitoring the amount of decrease in plate thickness and the generated heat amount. When joining is completed, if it is determined that the quality is unsatisfactory, defective joining is informed to the operator and is corrected. The amount of decrease in plate thickness determines the joining strength, since the remaining plate thickness after joining largely influences the joining strength.

Regarding the amount of decrease in plate thickness, a value obtained by subtracting the tool-to-tool distance from the total plate thickness is the total amount of decrease in plate thickness. The total amount of decrease in plate thickness is multiplied by a ratio of decrease in plate thickness {(amount of decrease in plate thickness of the upper member)/(total amount of decrease in plate thickness)}, thereby calculating the amount of decrease in plate thickness of the upper member. The amount of decrease in plate thickness of the lower member is calculated by subtracting the amount of decrease in plate thickness of the upper member from the total amount of decrease in plate thickness (see Expressions 2 to 4). As the ratio of decrease in plate thickness, one obtained in advance through an experiment or the like is set in advance.

(Total amount of decrease in plate thickness)=(total plate thickness)−(tool-to-tool distance)  (Expression 2)

(Amount of decrease in plate thickness of upper member)=(total amount of decrease in plate thickness)×(ratio of decrease in plate thickness) {(amount of decrease in plate thickness of upper member)/(total amount of decrease in plate thickness)}  (Expression 3)

(Amount of decrease in plate thickness of lower member)=(total amount of decrease in plate thickness)−(amount of decrease in plate thickness of upper member)  (Expression 4)

Figure 18:
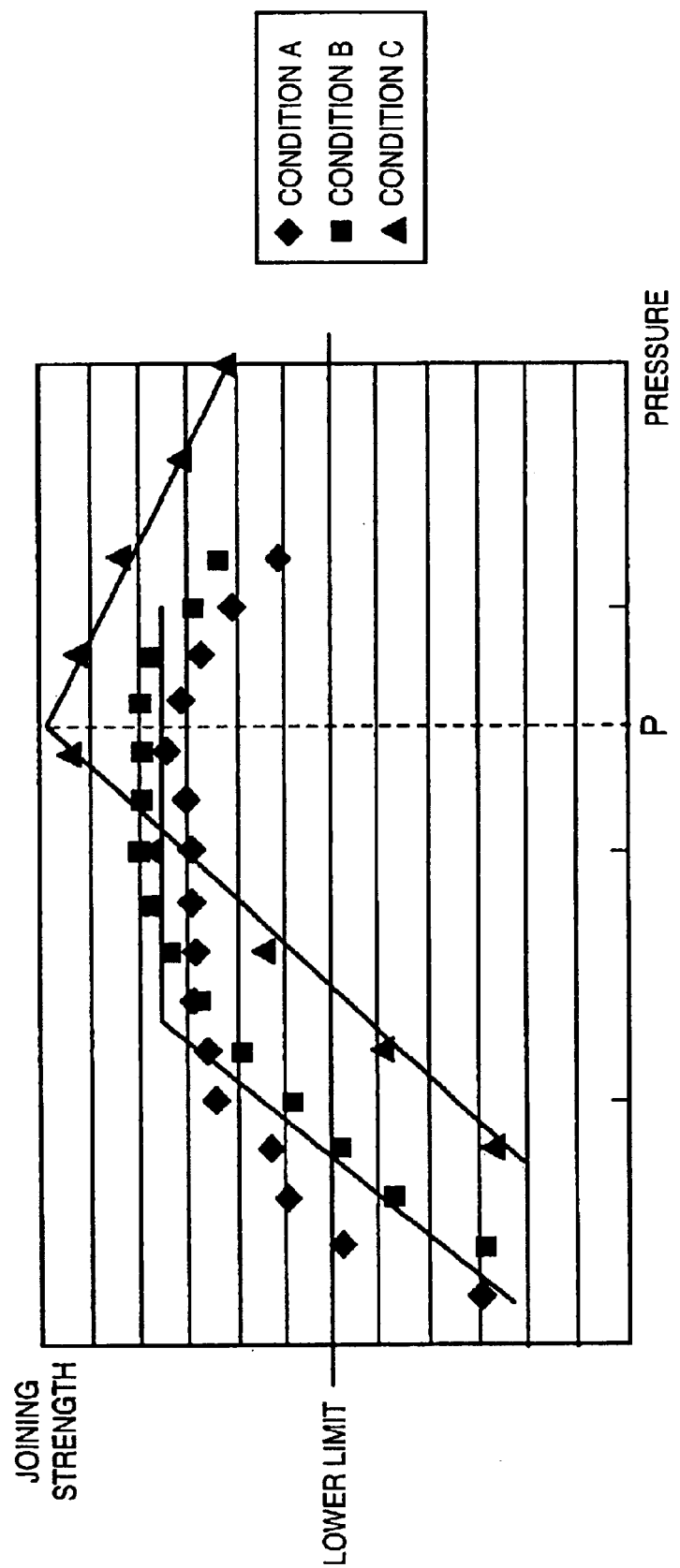
FIG. 18 is a graph showing the relationship between the pressure and the joining strength.

FIG. 18 shows the relationship between the pressure and the joining strength. Under joining conditions A, B, and C, when the joining strength exceeds its lower limit, it is determined that the quality can be guaranteed. When the joining strength is less than its lower limit, it is determined that the quality cannot be guaranteed.

Joining Quality Determination Method

The joining quality determination method in step S51 will be described.

Figure 17:
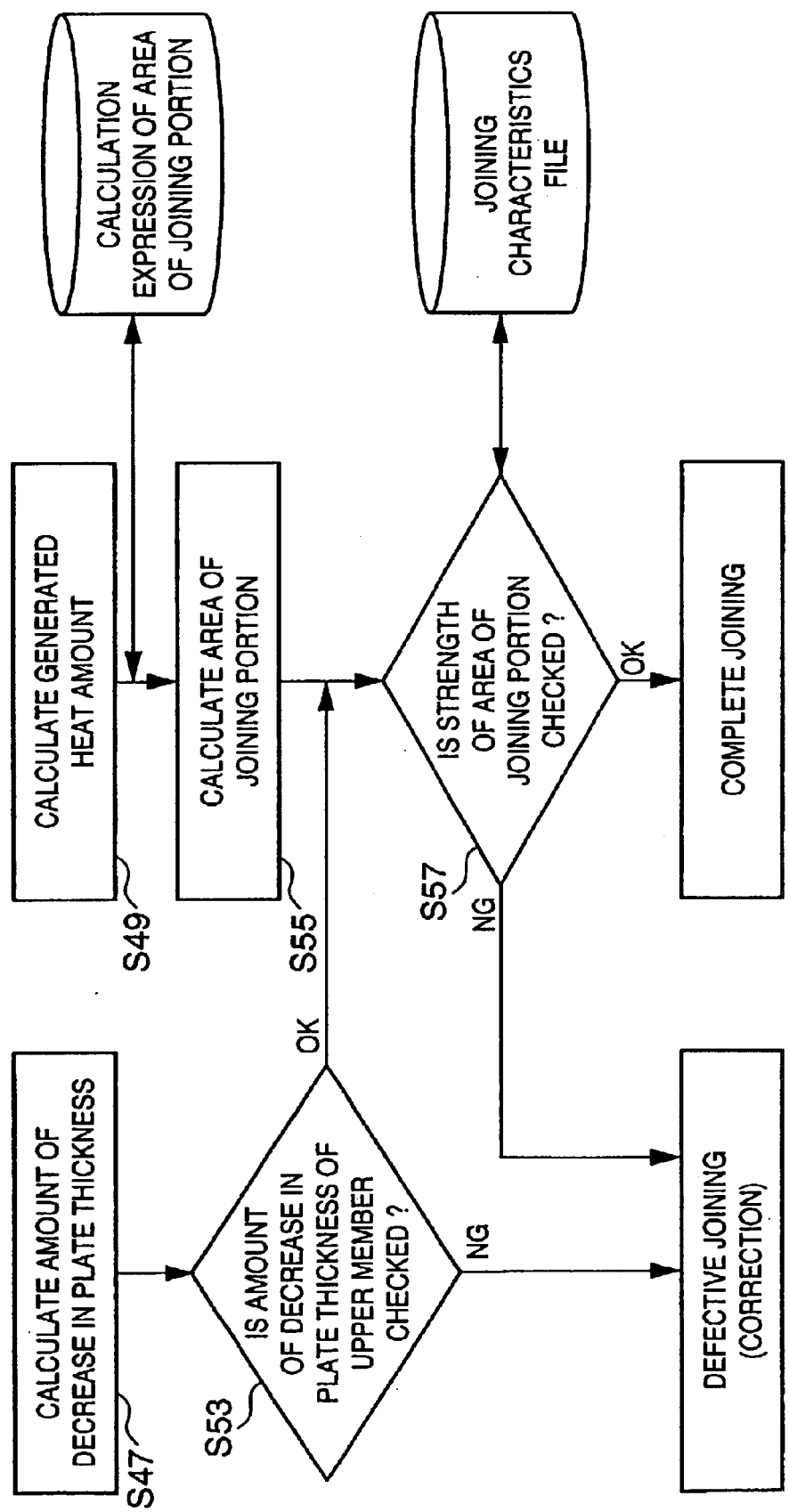
FIG. 17 is a flow chart for explaining the quality guaranteeing method in the frictional agitation joining method according to this embodiment.

FIG. 17 is a flow chart for explaining the quality guaranteeing method in the frictional agitation joining method according to this embodiment.

As shown in FIG. 17, in step S55, the generated heat amount calculated in step S49 is substituted, together with the generated heat amount obtained through an experiment or the like, in a calculation expression of the area (or diameter or the like) of the joining portion, thereby calculating the area of the joining portion. Simultaneously, in step S53, whether the amount of decrease in plate thickness calculated in step S47 falls within the preset reference value is checked. If the amount of decrease falls within the preset value, the strength of the area of the joining portion is checked in step S57. If the strength exceeds the reference value, the joining strength is difficult to assure, and it is determined that the quality cannot be guaranteed. Defective joining is informed to the operator, and is corrected.

In determining the strength of the area of the joining portion in step S57, whether the area of the joining portion falls within the reference value is checked from the joining characteristics file (see FIG. 18) stored in advance. If the area falls within the reference value, it is determined that the quality can be guaranteed, and joining is completed. If the area exceeds the reference value, the joining strength is difficult to assure, and it is determined that the quality cannot be guaranteed. Defective joining is informed to the operator, and is corrected.

As is apparent from FIG. 18, as the pressure is increased, the joining strength starts to decrease at a certain point P. This is because the amount of decrease in plate thickness increases to influence the joining strength. The joining conditions (pressure, rotational speed) are determined with reference to the point P where the joining strength starts to decrease as the reference value.

According to this embodiment, defective joining caused by facility abnormalities can be detected by means of the control parameters of the above joining facility (joining gun, rotary driving motor, vertical driving motor, rotary tool, and the like). The generated heat amount is calculated from the coefficient of kinetic friction of the members to be joined and the load (pressure, rotational speed, tool contact diameter, and the like) to be applied to the members. The joining quality is checked during joining from the relationship between the generated heat amount and the forcing amount (amount of decrease in plate thickness) of the rotary tool into the members. All joining can be inspected in a nondestructive manner. Whether quality guarantee can be performed can be determined within the manufacturing line (in-line).

The present invention is not limited to the above embodiments and various changes and modifications can be made within the spirit and scope of the present invention. Therefore, to apprise the public of the scope of the present invention the following claims are made.

Industrial Applicability

Continuous Joining

In the above embodiment, a case of overlaid joining has been described wherein the rotary tool 1 is pressurized against the joining portion and is not moved. Alternatively, two members may be abutted against each other, and be continuously joined to each other by moving forward or swinging the rotary tool 1 along the abutting surface.

The joining technique of this embodiment can also be applied to surface treatment of a metal member.

Surface treatment targets aluminum alloy castings, and is particularly used for a surface modifying treatment of a portion between adjacent ports (valve-to-valve portion) formed in the cylinder head of an automobile, a piston, or a brake disk. The surface modifying region of an aluminum alloy casting is fused by a frictional heat and agitated, so that the metal textures become smaller, the eutectic silicon (Si) particles are uniformly dispersed, and casting detects are decreased. As a result, in the material characteristics such as thermal fatigue (low cycle fatigue) service life, elongation, and shock resistance, a result better than in the conventional re-melt treatment can be obtained.

A storage medium storing a computer program for performing the joining control method, joining guaranteeing method, and joining quality determination method corresponding to the flow charts of FIGS. 15 to 17 and program codes necessary for it may be supplied to the computer. The computer may read the program codes stored in the storage medium and perform the process of the above embodiment.

What is claimed is:

1. A joining method using frictional agitation of rotating a rotary tool which has a first tool portion and a second tool portion with an area smaller than that of the first tool portion and projecting from a distal end of the first tool portion, overlaying first and second members with each other, and performing agitation with friction, thereby joining the first and second members, comprising the steps of:

urging and pressing the rotary tool into the first member from the second tool portion while the rotary tool is being rotated;

cutting the member around the rotary tool by rotating the rotary tool in the member into which the rotary tool has been pressed;

fusing the cut member by agitation by the first tool portion with friction in the member, causing to plastic flow the periphery portion of the region to be fused, and joining the first and second members to each other; and detecting a heat generating state of the members during joining, detecting a forced state of the rotary tool with respect to the members, detecting a joined state of the members from the heat generating state and forced state, and checking whether the joined state of the members is good or not from the joined state.

2. The joining method using friction agitation according to claim 1, wherein a generated heat amount of the heat generating state is calculated on the basis of a coefficient of kinetic friction of the members and a load acting on the members, and a forcing amount of the forced state is calculated on the basis of an encoder output of a motor that vertically moves the rotary tool with respect to the members.

3. A joining apparatus using frictional agitation of rotating a rotary tool, which has a first tool portion and a second tool portion with an area smaller than that of the first tool portion and projecting from a distal end of the first tool portion, overlaying first and second members with each other, and performing agitation with friction, thereby joining the first and second members, comprising:

a stationary tool which is arranged to oppose the rotary tool so that the first and second members are sandwiched by the stationary tool and rotary tool and such that a separation distance with respect to the rotary tool can be changed, and that distal end of the stationary tool which opposes the rotary tool is formed to have a sectional area smaller than at least that of a first tool portion of the rotary tool; and tool control means for urging and pressing the rotary tool into the first member from the second tool portion while the rotary tool is being rotated and the overlaid first and second members are received on the distal end of the stationary tool, wherein the tool control means controls to join the first and second members by rotating the rotary tool in the member into which the rotary tool has been pressed and by frictionally agitating the member around the rotary tool with the first and second tool portions, and when joining is ended, the rotary tool is retracted in a rotating state from the members.

4. The using apparatus is frictional agitation according to claim 3, wherein the distal end of the stationary tool has substantially the same area as that of a distal end of the second tool portion of the rotary took, and the stationary tool is formed such that the closer to a counter rotary tool side away from the distal end of the stationary tool, the larger a sectional area.

5. The joining apparatus using frictional agitation according to claim 3, wherein the distal end of the stationary tool forms a curved surface.

6. The joining apparatus using frictional agitation according to claim 3, wherein the first tool portion has a shoulder which is concentric and with a decreasing diameter from the first tool portion toward the second tool portion so as to form a step.

7. A joining apparatus using frictional agitation of rotating a rotary tool, which has a first tool portion and a second tool portion with an area smaller than that of the first tool portion and projecting from a distal end of the first tool portion, overlaid first and second members with each other, and performing agitation with friction, thereby joining the first and second members, comprising:

tool control means for urging and pressing the rotary tool into the first member from the second tool portion while the rotary tool is being rotated, and for controlling to join the first and second members by rotating the rotary tool in the member into which the rotary tool has been pressed and by frictionally agitating the member round the rotary tool with the first and second tool portions, and when joining is ended, retracting the rotary tool in a rotating state from the members;

generated heat detection means for detecting a heat generating state of the members during joining;

forced stated detection means for detecting a forced state of the rotary tool with respect to the members;

joined state detection means for detecting a joined state of the members from the heat generating state and forced state; and checking means for checking whether the joined state of the members is good or not from the joined state.

8. A joining method using frictional agitation of rotating a rotary tool which has a first tool portion and a second tool portion with an area smaller than that of the first tool portion and projecting from a distal end of the first tool portion, overlaying first and second members with each other, and performing agitation with friction, thereby joining the first and second members, comprising the steps of:

urging and pressing the rotary tool into the first member from the second tool portion while the rotary tool is being rotated;

joining the first and second members by rotating the rotary tool in the member into which the rotary tool has been pressed and by frictionally agitating the member around the rotary tool with the first and second tool portions;

detecting a heat generating state of the members during joining, detecting a forced state of the rotary tool with respect to the members, and detecting a joined state of the members from the heat generating state and forced state; and checking whether the joined state of the members is good or not from the joined state.

9. The joining method using frictional agitation according to claim 8, wherein a generated heat amount of the heat generating state is calculated on the basis of a coefficient of kinetic friction of the members and a load acting on the members, and a forcing amount of the forced state is calculated on the basis of an encoder output of a motor that vertically moves the rotary tool with respect to the members.

10. A joining method using frictional agitation of rotating a rotary tool which has a first tool portion and a second tool portion with an area smaller than that of the first tool portion and projecting from a distal end of the first tool portion, overlaying first and second members with each other, and locally agitating the overlying joining portion with friction, thereby locally joining the first and second members, comprising the steps of:

arranging a stationary tool to be oppose the rotary tool so that the first and second members are sandwiched by the rotary tool and such that a separation distance with respect to the rotary tool can be changed, and that distal end of the stationary tool which opposes the rotary tool has a receiving surface which is formed to have a sectional area smaller than at least that of a first tool portion of the rotary tool;

urging and pressing the rotary tool into the first member from the second tool portion while the rotary tool is being rotated and the overlaid first and second members are received on the receiving surface of the stationary tool;

cutting the member around the rotary tool by rotating the rotary toot in the member into which the rotary tool has been pressed;

fusing the cut member by agitation by the first tool portion with friction in the member, causing to plastic flow the periphery portion of the region to be fused, and joining the first and second members to each other; and when joining is ended, retracting the rotary tool in a rotating state from the members.

11. A joining method using frictional agitation of rotating a rotary tool which has a first tool portion and a second tool portion with an area smaller than that of the first tool portion and projecting from a distal end of the first tool portion, overlaying first and second members with each other, and locally agitating the overlaid joining portion with friction, thereby locally joining the first and second members, comprising the steps of:

arranging a stationary tool to be oppose the rotary tool so that the first and second members are sandwiched by the rotary tool and such that a separation distance with respect to the rotary tool can be changed, and that distal end of the stationary tool which opposes the rotary tool has a receiving surface which is formed to have a sectional area smaller than at least that of a first tool portion of the rotary tool;

urging and pressing the rotary tool into the first member from the second tool portion while the rotary tool is being rotated and the overlaid first and second members are received on the receiving surface of the stationary tool;

joining the first and second members by rotating the rotary tool in the member into which the rotary tool has been pressed and by frictionally agitating the member around the rotary tool with the first and second tool portions; and when joining is ended, retracting the rotary tool in a rotating state from the members.

* * * * *

UNITED STATES PATENT AND TRADEMARK OFFICE
CERTIFICATE OF CORRECTION

PATENT NO. : 6,789,722 B2
APPLICATION NO. : 10/296715
DATED : September 14, 2004
INVENTOR(S) : Kotoyoshi Murakami It is certified that error appears in the above-identified patent and that said Letters Patent is hereby corrected as shown below:

Title Page, [56] References Cited
U.S. PATENTS DOCUMENT
Please ADD --4,087,036  05/1978  Corbett et al.    228/102--;
--6,053,391  04/2000  Heideman et al.  228/2.1--.

[57] ABSTRACT
replace with new Abstract,
--A joining method using frictional agitation of a rotary tool which has a first portion and a second portion with an area smaller than that of the first portion and projecting from a distal end of the first portion, overlaying first and second members, the method including pressing the rotary tool into the first member from the second portion while the rotary tool is rotated; cutting the member by rotating the rotary tool; fusing the cut member by agitation, causing to plastic flow the periphery portion of the region to be fused, joining together the first and second members; and detecting a heat generating state of the members during joining, detecting a forced state of the rotary tool with respect to the members, detecting a joined state of the members from the heat generating state and forced state, and checking if the joined state is good.--

Column 2,   line 49, before "distal" insert --a--.

Column 3,   line 29, before "distal" insert --a--;
line 52, after "concentric" insert --with--;
line 59, change "stated" to --state--.

Column 7,   line 22, before "or" insert --,--.

Column 12,  line 31, change "49" to --S49--.

Column 14,  line 14, change "detects" to --defects--.

UNITED STATES PATENT AND TRADEMARK OFFICE
CERTIFICATE OF CORRECTION

| | | |
|---|---|---|
| PATENT NO. | : 6,789,722 B2 | |
| APPLICATION NO. | : 10/296715 | |
| DATED | : September 14, 2004 | |
| INVENTOR(S) | : Kotoyoshi Murakami | |

It is certified that error appears in the above-identified patent and that said Letters Patent is hereby corrected as shown below:

Column 15, line 2, (claim 3, line 12) before "distal" insert --a--;
line 19, (claim 4, line 1) change "using apparatus is frictional agitation" to --joining apparatus using frictional agitation--;
line 22, (claim 4, line 4) change "took" to --tool--;
line 47, (claim 7, line 14) change "round" to --around--;
line 53, (claim 7, line 19) change "stated" to --state--.

Column 16, line 35, (claim 10, line 9), change "to be oppose" to --to oppose--;
line 38, (claim 10, line 12) before "distal" insert --a--;
line 51, (claim 10, line 23) change "toot" to --tool--.

Column 17, line 1, (claim 11, line 1) change "to be oppose" to --to oppose--.

Column 18, line 11, please add claim 12;
--12. A joining apparatus using frictional agitation of rotating a rotary tool, which has a first tool portion and a second tool portion with an area smaller than that of the first tool portion and projecting from a distal end of the first tool portion, overlaying first and second members with each other, and performing agitation with friction, thereby joining the first and second members, the apparatus comprising:
tool control means for urging and pressing the rotary tool into the first member from the second tool portion while the rotary tool is being rotated, cutting the member around the rotary tool by rotating the rotary tool in the member into which the rotary tool has been pressed, fusing the cut member by agitation of the first tool portion with friction in the member, and extending the region to be fused to the second member to join the first and second member to each other; and

UNITED STATES PATENT AND TRADEMARK OFFICE
CERTIFICATE OF CORRECTION

PATENT NO. : 6,789,722 B2
APPLICATION NO. : 10/296715
DATED : September 14, 2004
INVENTOR(S) : Kotoyoshi Murakami It is certified that error appears in the above-identified patent and that said Letters Patent is hereby corrected as shown below:

Column 18, (Cont.)   a stationary tool arranged to oppose the rotary tool so that the first and second members are sandwiched by the stationary tool and rotary tool and such that a separation distance with respect to the rotary tool can be changed, and that a distal end of the stationary tool which opposes the rotary tool is formed to have a sectional area smaller than at least that of a first tool portion of the rotary tool.--

Signed and Sealed this

Nineteenth Day of February, 2008

JON W. DUDAS
*Director of the United States Patent and Trademark Office*